(12) United States Patent
Tsuji et al.

(10) Patent No.: US 9,869,767 B2
(45) Date of Patent: Jan. 16, 2018

(54) LASER RADAR DEVICE

(71) Applicant: Mitsubishi Electric Corporation, Tokyo (JP)

(72) Inventors: Hidenobu Tsuji, Tokyo (JP); Masaharu Imaki, Tokyo (JP); Nobuki Kotake, Tokyo (JP); Hideaki Ochimizu, Tokyo (JP); Shumpei Kameyama, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 125 days.

(21) Appl. No.: 14/784,688

(22) PCT Filed: Apr. 28, 2014

(86) PCT No.: PCT/JP2014/061878
§ 371 (c)(1),
(2) Date: Oct. 15, 2015

(87) PCT Pub. No.: WO2014/178376
PCT Pub. Date: Nov. 6, 2014

(65) Prior Publication Data
US 2016/0061952 A1 Mar. 3, 2016

(30) Foreign Application Priority Data
Apr. 30, 2013 (JP) .................. 2013-095236

(51) Int. Cl.
*G01S 17/42* (2006.01)
*G01S 17/87* (2006.01)
(Continued)

(52) U.S. Cl.
CPC .............. *G01S 17/42* (2013.01); *G01S 7/497* (2013.01); *G01S 17/87* (2013.01); *G01S 17/88* (2013.01);
(Continued)

(58) Field of Classification Search
CPC ..... G01S 17/89; G01S 7/4808; G06K 9/3241; G08G 1/04; G08G 1/056; G06T 7/194; G06T 7/38; G06T 7/74
See application file for complete search history.

(56) References Cited

U.S. PATENT DOCUMENTS

| 4,963,024 A | 10/1990 | Ulich | |
|---|---|---|---|
| 2014/0118716 A1* | 5/2014 | Kaganovich | ............ G01S 17/89 356/4.01 |

FOREIGN PATENT DOCUMENTS

| EP | 2 515 143 A1 | 10/2012 |
|---|---|---|
| EP | 2515143 | * 10/2012 |

(Continued)

OTHER PUBLICATIONS

Yeun-Soo Jung et al.; Advances in Sea Coverage Methods Using Autonomous Underwater Vehicles (AUVs); Recent Advances in Multi-Robot Systems; May 1, 2008; pp. 68-101; I-Tech Education and Publishing; Vienna, Austria.

(Continued)

*Primary Examiner* — Luke D Ratcliffe
(74) *Attorney, Agent, or Firm* — Studebaker & Brackett PC

(57) ABSTRACT

A laser radar device includes a searchable distance calculation device 2 to calculate an amount of attenuation at a time of propagation of a light wave from a temporal change in scattered light intensity measured by a marine snow measurement device 1, and calculate a searchable distance in a target search device 4 from the amount of attenuation.

10 Claims, 14 Drawing Sheets

(51) Int. Cl.
*G01S 17/93* (2006.01)
*G01S 17/88* (2006.01)
*G01S 17/95* (2006.01)
*G01S 7/497* (2006.01)

(52) U.S. Cl.
CPC ............. *G01S 17/93* (2013.01); *G01S 17/95* (2013.01); *G01S 17/933* (2013.01); *G01S 17/936* (2013.01)

(56) References Cited

FOREIGN PATENT DOCUMENTS

| JP | 03-501652 A | 4/1991 |
|---|---|---|
| JP | 05-205191 A | 8/1993 |
| JP | 07-318650 A | 12/1995 |
| JP | 08-043532 A | 2/1996 |
| JP | 2010-217995 A | 9/2010 |
| JP | 2011-016421 | 1/2011 |

OTHER PUBLICATIONS

The extended European search report issued by the European Patent Office on Nov. 17, 2016, which corresponds to European Patent Application No. 14792226.4-1812 and is related to U.S. Appl. No. 14/784,688.
International Search Report, PCT/JP2014/061878, dated Jun. 10, 2014.

* cited by examiner

LASER RADAR DEVICE

FIELD OF THE INVENTION

The present invention relates to a laser radar device that detects an object by using a light wave.

BACKGROUND OF THE INVENTION

A conventional laser radar device radiates a light wave to a target, calculates the distance to the target from the round trip time of reflected light of the light wave, and specifies the position and the size of the target by performing two-dimensional scanning on the above-mentioned light wave, and also performs determination on the basis of thresholds for position and size to detect the target (for example, patent reference 1).

RELATED ART DOCUMENT

Patent Reference

Patent reference 1: Japanese Unexamined Patent Application Publication No. 2011-16421

SUMMARY OF THE INVENTION

Problems to be Solved by the Invention

In a case in which an area in which a target needs to be searched for is specified more widely than an area in which the reflected light of the light wave can be received, the laser radar device needs to move while radiating the light wave and search through the area in order to detect the target.

However, when a technique disclosed in patent reference 1 is applied to the above-mentioned case, if scattering matter exists in the medium in which the light wave propagates, the light wave attenuates due to scattering. As a result, the searchable distance (measurable distance), i.e., the range which extends from the position of the laser radar device and in which the reflected light can be detected becomes narrow. When the value of the searchable distance which has become narrow because of the attenuation of the light wave is not recognized, there is a possibility that even if the laser radar device moves while radiating the light wave, there occurs an area in which the search using the light wave cannot reach any target, and therefore no target can be detected.

In contrast, even if scattering matter hardly exists and the searchable distance is long, when the value of the searchable distance is not recognized, an overlap may occur between the search range at a certain position and the search range at a position to which the laser radar device has moved from the above-mentioned position, and a waste of time may occur in the search time.

More specifically, under conditions where the searchable distance is not known, the search performed by the laser radar device is inefficient.

The present invention is made in order to solve the above-mentioned problem, and it is therefore an object of the present invention to provide a laser radar device that can prevent omissions in the detection of a target and increase in the search time due to an overlap of the search range from occurring, and that can perform an efficient search.

Means for Solving the Problem

In accordance with the present invention, there is provided a laser radar device including: a scattered light measurement instrument to measure a temporal change in the scattered light intensity of scattered light acquired through scattering of a light wave while propagating; a distance measurement instrument to perform a distance measurement on surroundings by using reflected light of a light wave; a measurable distance calculator to calculate an amount of attenuation at the time of propagation of the light wave from the temporal change in the scattered light intensity which is measured by the scattered light measurement instrument, and calculate a measurable distance in the distance measurement instrument from the amount of attenuation; a target detector to calculate three dimensional data from distances of surrounding points which are measured by the distance measurement instrument, to detect a target from the three dimensional data; a moving route calculator to calculate a moving route of a moving object by using the measurable distance calculated by the measurable distance calculator; a position direction recognizer to measure an acceleration of the moving object to recognize a position and a direction; and a movement controller to move the moving object according to the moving route calculated by the moving route calculator.

Advantages of the Invention

Because the laser radar device in accordance with the present invention can grasp the searchable distance, the laser radar device can prevent omissions in the detection of a target and increase in the search time due to an overlap of the search range from occurring and can perform an efficient search.

EMBODIMENTS OF THE INVENTION

Hereafter, in order to explain this invention in greater detail, the preferred embodiments of the present invention will be described with reference to the accompanying drawings.

Embodiment 1

Figure 1:
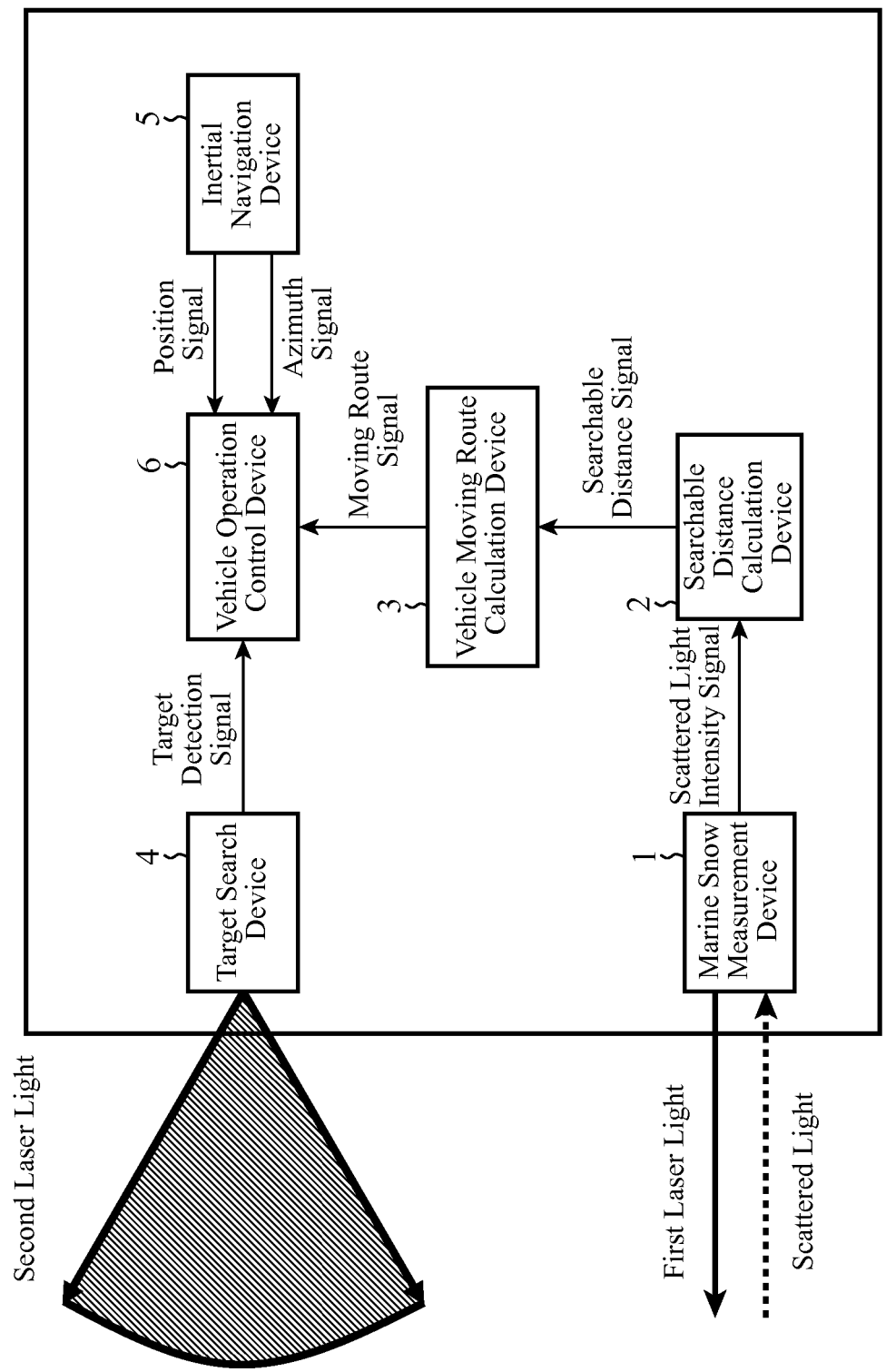
FIG. 1 is a diagram showing the configuration of a laser radar device in accordance with Embodiment 1 of the present invention.

A laser radar device in accordance with Embodiment 1 of the present invention will be explained by using FIG. 1. FIG. 1 is the structural diagram of the laser radar device in accordance with Embodiment 1 of the present invention. The laser radar device in accordance with Embodiment 1 of the present invention is provided with a marine snow measurement device 1, a searchable distance calculation device 2, a vehicle moving route calculation device 3, a target search device 4, an inertial navigation device 5, and a vehicle operation control device 6.

Figure 2:
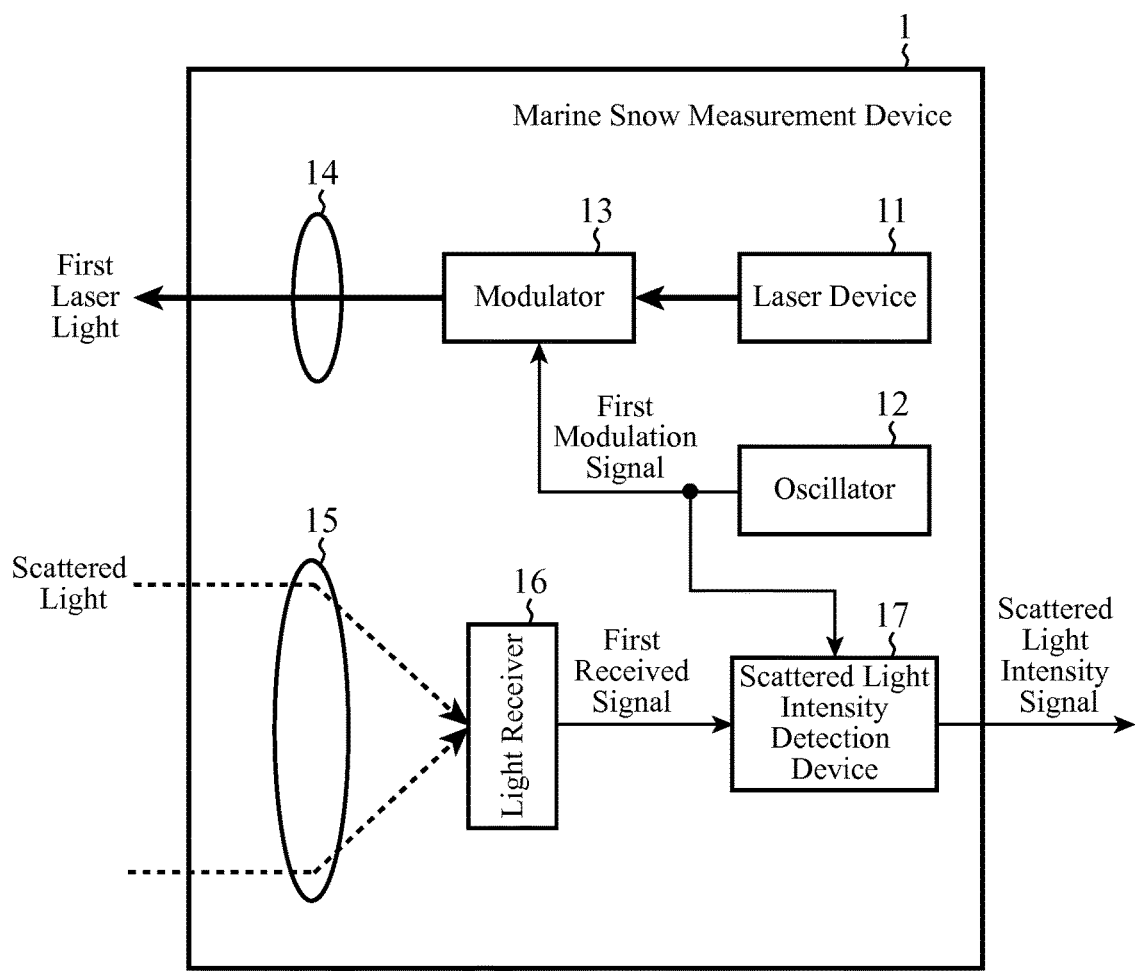
FIG. 2 is a diagram showing the configuration of a marine snow measurement device of the laser radar device in accordance with Embodiment 1 of the present invention.

The configuration of the marine snow measurement device 1 is shown in FIG. 2. The marine snow measurement device 1 is provided with a laser device 11, an oscillator 12, a modulator 13, a transmission lens 14, a reception lens 15, a light receiver 16, and a scattered light intensity detection device 17.

The laser device 11 has a function of oscillating first laser light. The oscillator 12 has a function of outputting a first modulation signal. The modulator 13 has a function of performing intensity modulation on the first laser light according to the first modulation signal. The transmission lens 14 has a function of adjusting the divergence of the first laser light.

The reception lens 15 has a function of focusing light scattered from an object and propagating in a coaxial direction with respect to the center of a receiving field of view. The light receiver 16 has a function of converting the light focused by the reception lens 15 into an electric signal, and outputting this electric signal as a first received signal.

The scattered light intensity detection device 17 has a function of measuring a temporal change in the intensity of the scattered light on the basis of the first received signal and the first modulation signal with the time when the first modulation signal is inputted thereto being set as a time origin, and outputting the temporal change as a scattered light intensity signal.

The laser device 11, the oscillator 12, the modulator 13, and the transmission lens 14 construct a light projector for scattered light measurement.

Further, the reception lens 15 and the light receiver 16 construct a light receiver for scattered light measurement.

Further, the scattered light intensity detection device 17 constructs a scattered light measurement instrument.

The searchable distance calculation device 2 has a function of, by using two threshold voltages $V_1$ and $V_2$ which are set in advance by a user or the like, measuring the times $t_1$ and $t_2$ when the scattered light intensity signal has values less than the threshold voltages $V_1$ and $V_2$, respectively, to calculate an attenuation coefficient showing the amount of attenuation of the laser light. The searchable distance calculation device 2 also has a function of calculating a searchable distance from this attenuation coefficient, and outputting the searchable distance as a searchable distance signal.

The searchable distance calculation device 2 constructs a measurable distance calculator.

The vehicle moving route calculation device 3 has a function of, by using both the searchable distance signal and a target search area which is set in advance by the user or the like, calculating a moving route which enables the laser radar device to search for a target in the target search area without omissions and an overlap, and outputting the moving route as a moving route signal.

The vehicle moving route calculation device 3 constructs a moving route calculator.

Figure 3:
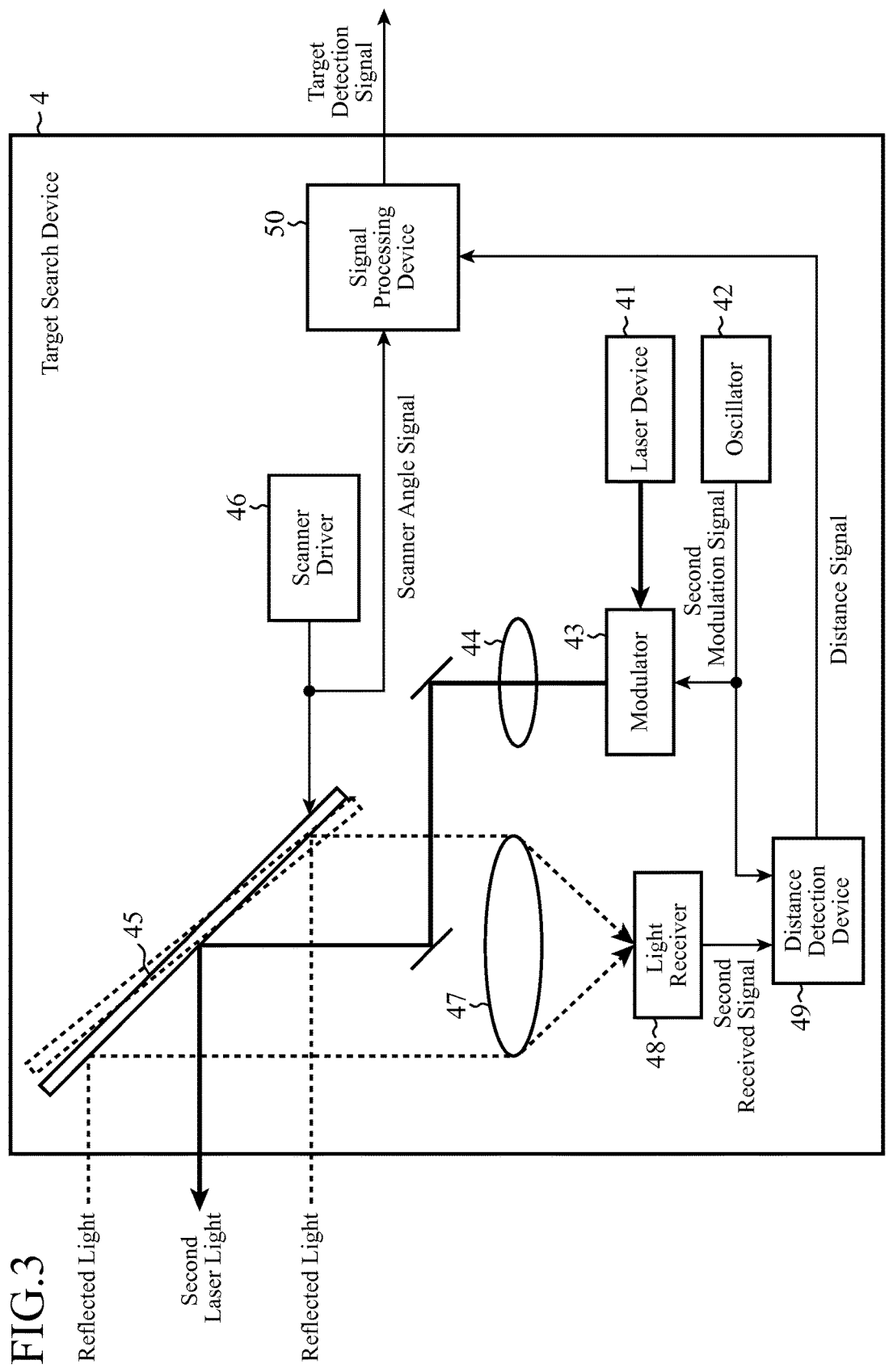
FIG. 3 is a diagram showing the configuration of a target search device of the laser radar device in accordance with Embodiment 1 of the present invention.

The configuration of the target search device 4 is shown in FIG. 3. The target search device 4 is provided with a laser device 41, an oscillator 42, a modulator 43, a transmission lens 44, a scanner 45, a scanner driver 46, a reception lens 47, a light receiver 48, a distance detection device 49, and a signal processing device 50.

The laser device 41 has a function of oscillating second laser light. The oscillator 42 has a function of outputting a second modulation signal. The modulator 43 has a function of performing intensity modulation on the second laser light according to the second modulation signal. The transmission lens 44 has a function of adjusting the divergence of the second laser light. The scanner driver 46 has a function of outputting a scanner angle signal for specifying an angle of the scanner 45. The scanner 45 has a function of scanning a transmission direction and a receiving field of view of the second laser light according to the scanner angle signal.

The reception lens 47 has a function of focusing reflected light reflected from an object and propagating in a coaxial direction with respect to the center of a receiving field of view. The light receiver 48 has a function of converting the light focused by the reception lens 47 into an electric signal, and outputting this electric signal as a second received signal.

The distance detection device 49 has a function of measuring a flight distance and a flight time of the above-mentioned reflected light on the basis of the second received signal and the second modulation signal, thereby detecting the distance from the object which has caused the reflected light to the laser radar device, and outputting this distance as a distance signal.

The signal processing device 50 has a function of generating three dimensional data about an area surrounding a vehicle by using the distance signal and the scanner angle signal. The signal processing device 50 also has a function of determining whether there exists an object having the same size as an expected target size which is specified in advance by the user or the like by using the above-mentioned three dimensional data and outputting a target detection signal when determining that the above-mentioned object exists.

The laser device 41, the oscillator 42, the modulator 43, the transmission lens 44, the scanner 45, and the scanner driver 46 construct a light projector for distance measurement.

Further, the reception lens 47 and the light receiver 48 construct a light receiver for distance measurement.

Further, the distance detection device 49 constructs a distance measurement instrument.

The signal processing device 50 constructs a target detector.

Figure 4:
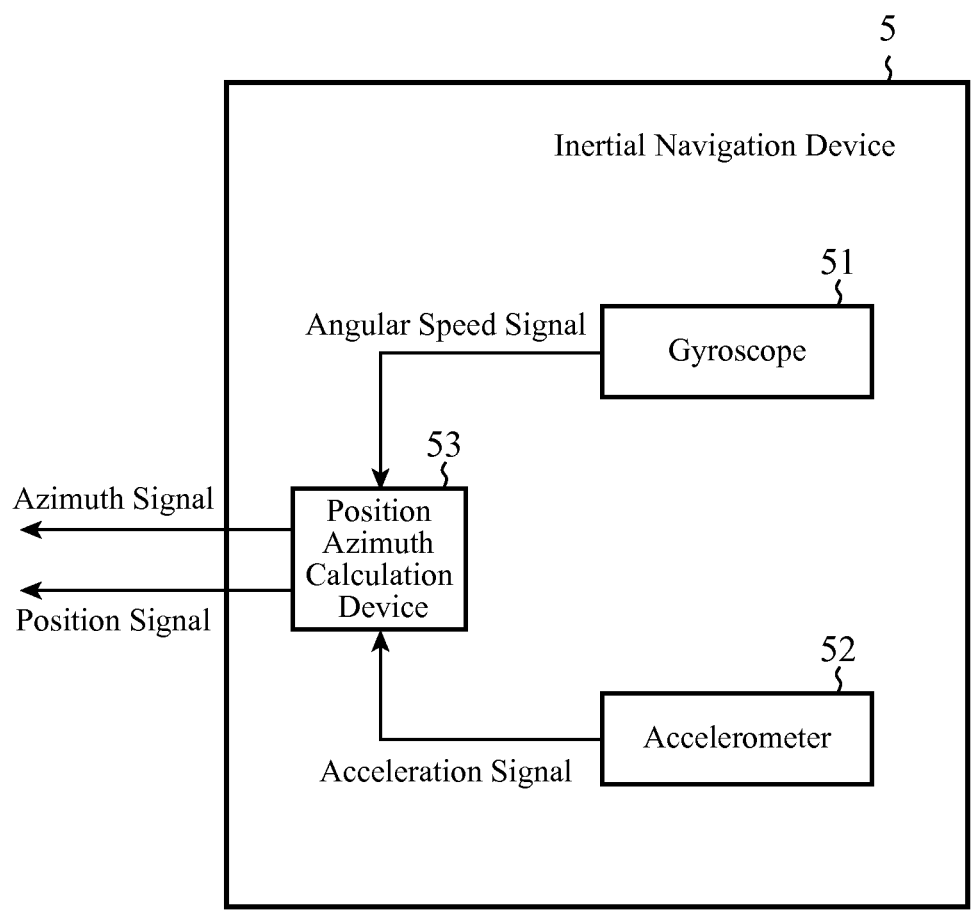
FIG. 4 is a diagram showing the configuration of an inertial navigation device of the laser radar device in accordance with Embodiment 1 of the present invention.

The configuration of the inertial navigation device 5 is shown in FIG. 4. The inertial navigation device 5 is provided with a gyroscope 51, an accelerometer 52, and a position azimuth calculation device 53.

Functions of the inertial navigation device 5 will be explained. The gyroscope 51 has a function of measuring the angular speed of the vehicle and outputting this angular speed as an angular speed signal. The accelerometer 52 has a function of measuring the acceleration of the vehicle and outputting this acceleration as an acceleration signal.

The position azimuth calculation device 53 has a function of calculating an azimuth variation by time-integrating the angular speed shown by the angular speed signal with reference to an azimuth which was measured, by using GPS or the like, on the sea or on the land before the vehicle has been navigating in the sea, thereby calculating a current azimuth and outputting this current azimuth as an azimuth signal.

The position azimuth calculation device 53 also has a function of calculating an amount of change in the speed by time-integrating the acceleration shown by the acceleration signal with reference to a position which was measured, by using GPS or the like, on the sea or on the land before the vehicle has been navigating in the sea, and further calculating an amount of change in the position by time-integrating the amount of change in the speed, thereby calculating a current position and outputting this current position as a position signal.

The inertial navigation device 5 constructs a position direction recognizer.

The vehicle operation control device 6 has a function of controlling the vehicle on the basis of both the current position shown by the position signal and the current azimuth shown by the azimuth signal in such away that the vehicle moves along the moving route shown by the moving route signal. The vehicle operation control device 6 also has a function of stopping the movement of the vehicle when the target detection signal is inputted thereto.

The vehicle operation control device 6 constructs a movement controller.

Next, the operation of the laser radar device in accordance with this Embodiment 1 configured as above will be explained.

The laser device 11 of the marine snow measurement device 1 oscillates first laser light, and outputs this first laser light to the modulator 13. The oscillator 12 outputs a first modulation signal to the modulator 13 and the scattered light intensity detection device 17. The modulator 13 modulates the intensity of the first laser light according to the first modulation signal, and outputs this first laser light to the transmission lens 14. The transmission lens 14 adjusts the divergence of the first laser light inputted thereto, and outputs this first laser light into the sea.

The reception lens 15 focuses scattered light scattered by marine snow in the sea, and outputs this scattered light to the light receiver 16. The light receiver 16 converts the light focused by the reception lens 15 into an electric signal, and outputs this electric signal to the scattered light intensity detection device 17 as a first received signal.

The scattered light intensity detection device 17 measures a temporal change in the scattered light intensity on the basis of the first received signal and the first modulation signal with the time when the first modulation signal is inputted thereto being set as a time origin, and outputs the temporal change to the searchable distance calculation device 2 as a scattered light intensity signal. An example of the scattered light intensity signal is shown in FIG. 5.

Figure 5:
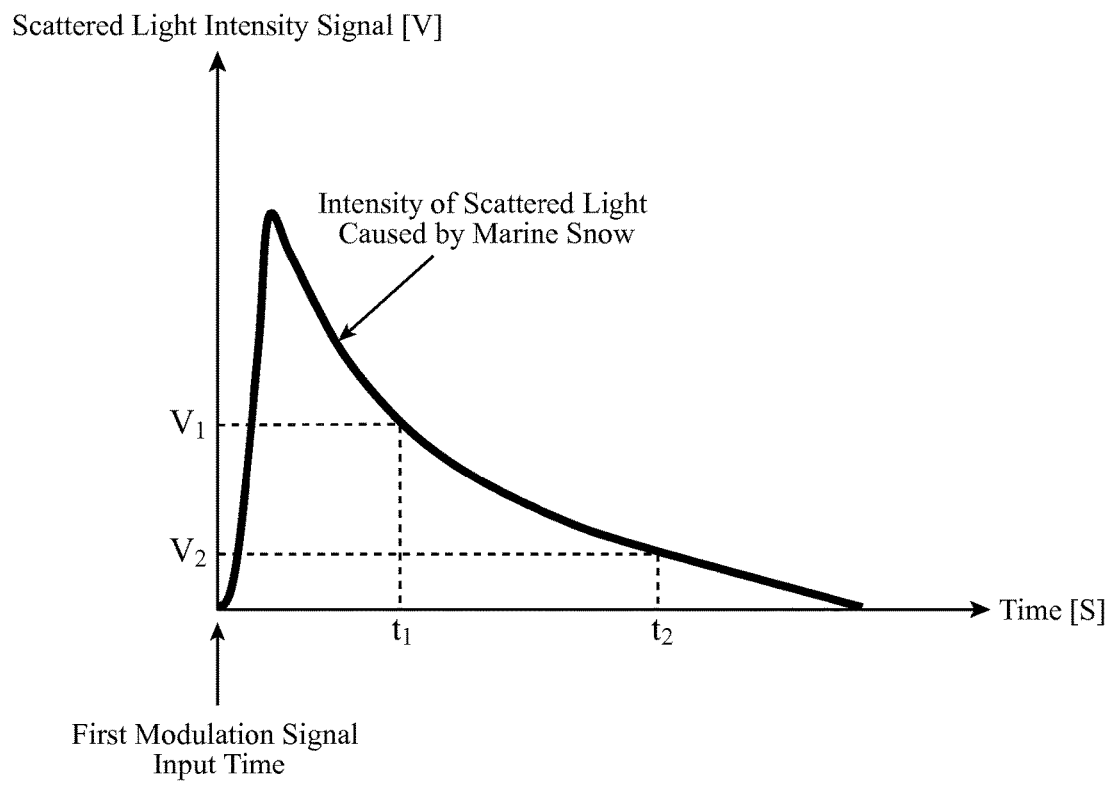
FIG. 5 is a diagram showing an example of a scattered light intensity signal.

The searchable distance calculation device 2 measures the times $t_1$ and $t_2$ when the scattered light intensity signal inputted thereto has values less than the threshold voltages $V_1$ and $V_2$, respectively, by using the two threshold voltages $V_1$ and $V_2$ which are set in advance by the user or the like, as shown in FIG. 5. The threshold voltage $V_1$ is set in such a way as to satisfy $V_1 > V_2$, and the threshold voltage $V_2$ is set in such a way as to be higher than a noise voltage.

The searchable distance calculation device 2 also calculates an attenuation coefficient by using the measured times $t_1$ and $t_2$. A computation expression of the attenuation coefficient is shown in the following equation (1).

$$\alpha = \frac{\log\left(\frac{V_2}{V_1}\frac{t_2^2}{t_1^2}\right)}{c(t_1 - t_2)} \tag{1}$$

In the equation (1), c denotes the speed of light and $\alpha$ denotes the attenuation coefficient.

If the peak voltage of the scattered light intensity signal is lower than the threshold voltage $V_1$, the above-mentioned time $t_1$ cannot be measured and therefore the attenuation coefficient cannot be measured. In this case, it is determined that the amount of marine snow is small, and an attenuation coefficient provided for a case in which no marine snow exists, which is set in advance by the user or the like, is used.

The searchable distance calculation device 2 further calculates a searchable distance L by using the attenuation coefficient $\alpha$, and outputs this searchable distance to the vehicle moving route calculation device 3 as a searchable distance signal. A computation expression of the searchable distance L is shown in the following equation (2).

$$L = -\frac{1}{2\alpha}\log\left(\frac{P_R}{P_L\eta\frac{1}{4L^2}R}\right) \tag{2}$$

In the equation (2), $P_R$ denotes the received light power which is a measurement limit, $P_L$ denotes the laser light power, $\eta$ denotes system efficiency, and R denotes the reflectivity of a target. The parameters $P_R$, $P_L$, $\eta$, and R are set in advance by the user or the like.

On the basis of the searchable distance L and the target search area in which there can exist a target and which is set in advance by the user or the like, the vehicle moving route calculation device 3 calculates a moving route of the vehicle which prevents the search range from overlapping and which enables the laser radar device to perform a search through the target search area without omissions, and outputs the moving route to the vehicle operation control device 6 as a moving route signal.

Figure 6:
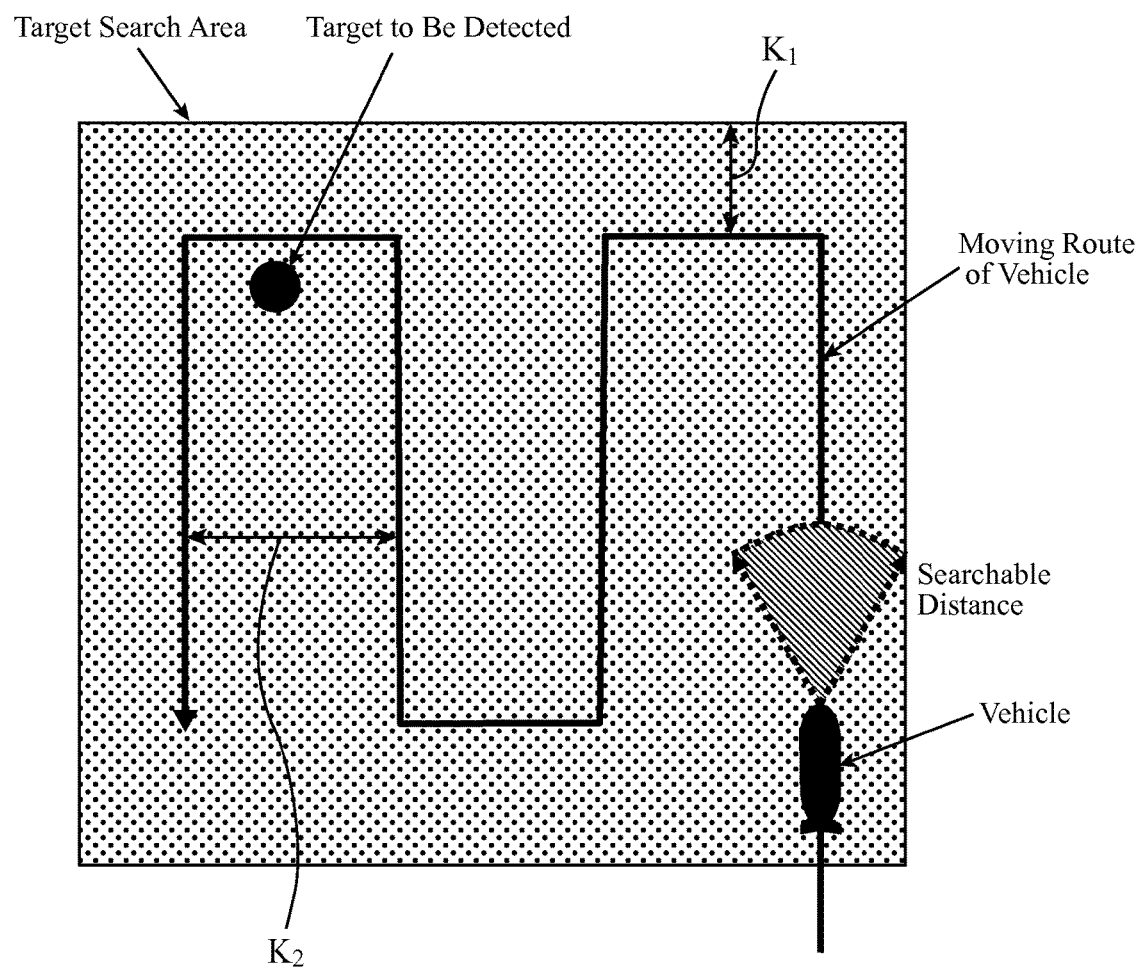
FIG. 6 is a diagram showing a moving route when there is little marine snow.

Because the searchable distance is long when, for example, there is little marine snow, the gap between the boundary of the target search area and the moving route of the vehicle (for example, $K_1$ in the figure), the gap between adjacent paths of the moving route ($K_2$ in the figure), and so on are wide in the moving route calculated, as shown in FIG. 6, and the length of the entire moving route is short. In contrast, because the searchable distance is short when, for example, there is much marine snow, as shown in FIG. 7, the gap between the boundary of the target search area and the moving route of the vehicle (for example, $K_1$ in the figure), the gap between adjacent paths of the moving route ($K_2$ in the figure), and so on are narrow in the moving route calculated, as shown in FIG. 7, and the length of the entire moving route is long.

Figure 7:
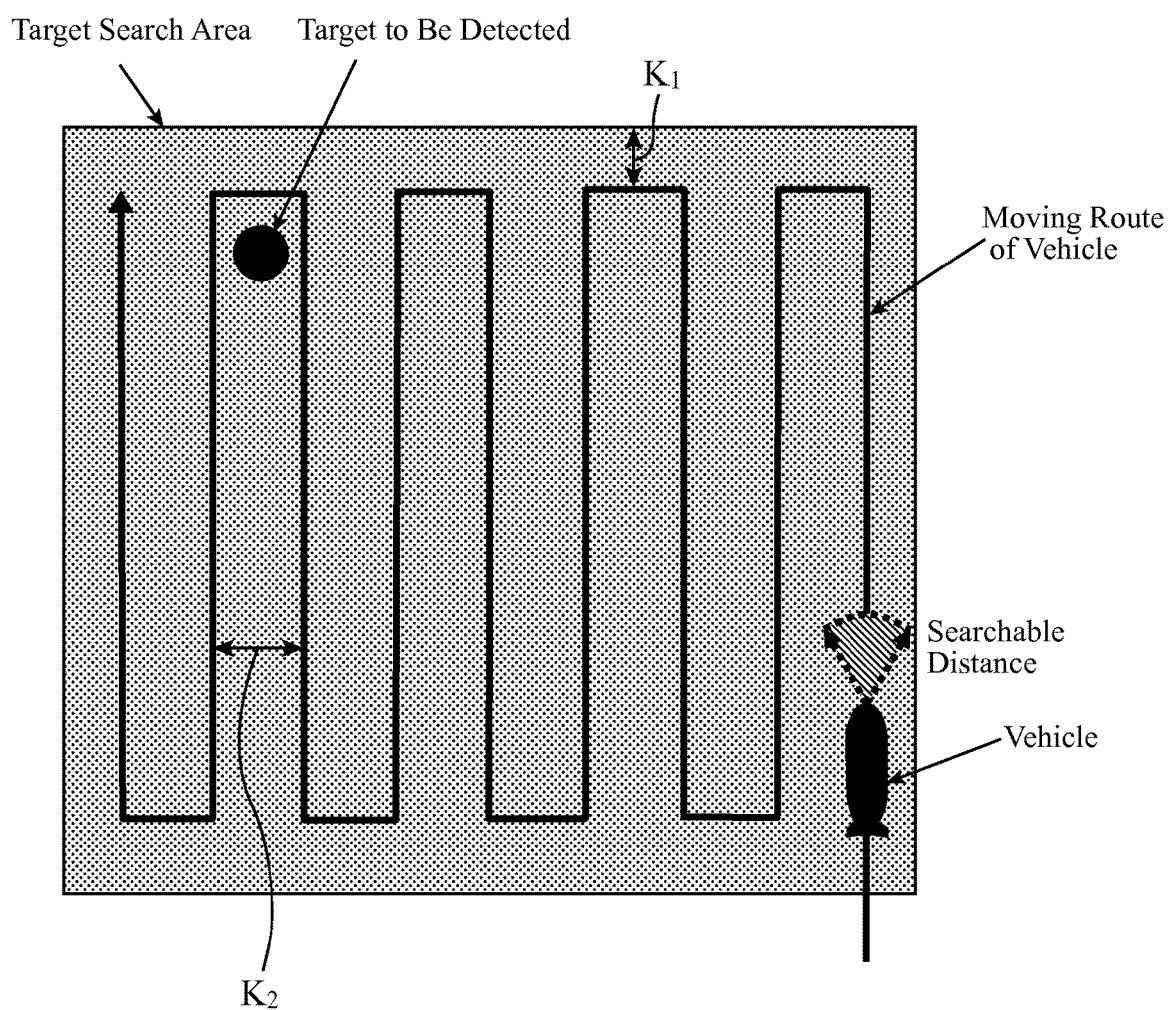
FIG. 7 is a diagram showing a moving route when there is much marine snow.

In any of the cases of FIGS. 6 and 7, the moving route calculated is the one which enables the laser radar device to perform a search through the target search area without omissions and which prevents any needless overlap from occurring in the search range.

The gyroscope 51 of the inertial navigation device 5 measures the angular speed, and outputs this angular speed to the position azimuth calculation device 53 as an angular speed signal. Further, the accelerometer 52 measures the acceleration and outputs this acceleration to the position azimuth calculation device 53 as an acceleration signal.

The position azimuth calculation device 53 calculates an azimuth variation by time-integrating the angular speed shown by the angular speed signal with reference to an azimuth which was measured, by using GPS or the like, on the sea or on the land before the vehicle has been navigating in the sea, thereby calculating the current azimuth and outputting this current azimuth as an azimuth signal. Further, the position azimuth calculation device 53 similarly calculates an amount of change in the speed by time-integrating the acceleration shown by the acceleration signal with reference to a position which was measured, by using GPS or the like, on the sea or on the land before the vehicle has been navigating in the sea, and further calculates an amount of change in the position by time-integrating the amount of change in the speed, thereby calculating the current position and outputting this current position as a position signal.

The vehicle operation control device 6 controls the vehicle on the basis of both the current position and the current azimuth which are shown respectively by the position signal and the azimuth signal, which are outputted by the position azimuth calculation device 53, in such a way that the vehicle moves along the moving route shown by the moving route signal. The vehicle operation control device 6 also stops the movement of the vehicle when a target detection signal which will be mentioned below is inputted thereto from the target search device 4.

The laser radar device in accordance with the present invention searches for a target by using the target search device 4 while controlling the movement of the vehicle in the above-mentioned way.

The laser device 41 of the target search device 4 oscillates second laser light, and outputs this second laser light to the modulator 43. The oscillator 42 outputs a second modulation signal to the modulator 43 and the distance detection device 49. The modulator 43 modulates the intensity of the second laser light according to the second modulation signal, and outputs the second laser light to the transmission lens 44. The transmission lens 44 adjusts the divergence of the second laser light, and outputs the second laser light into the sea. At that time, the second laser light is scanned by the scanner 45. More specifically, the scanner driver 46 outputs a scanner angle signal for specifying an angle of the scanner 45 to the scanner 45, and the scanner 45 scans the transmission direction and the receiving field of view of the second laser light according to the scanner angle signal. The scanner driver 46 also outputs the scanner angle signal to the signal processing device 50.

The reception lens 47 focuses reflected light reflected from an object and propagating in a coaxial direction with respect to the center of the receiving field of view, and outputs the reflected light to the light receiver 48. The light receiver 48 converts the above-mentioned focused light into an electric signal and outputs this electric signal to the distance detection device 49 as a second received signal.

The distance detection device 49 measures a flight distance and a flight time of the above-mentioned reflected light on the basis of the second received signal and the second modulation signal, thereby detecting the distance to the object and outputting this distance to the signal processing device 50 as a distance signal.

The signal processing device 50 generates three dimensional data about an area surrounding the vehicle by using the distance signal and the scanner angle signal. The signal processing device 50 also has determines whether there exists an object having the same size as an expected target size which is specified in advance by the user or the like by using the above-mentioned three dimensional data and outputs a target detection signal when determining that the above-mentioned object exists. As mentioned above, when the target detection signal is outputted to the vehicle operation control device 6, the movement of the vehicle is stopped.

As mentioned above, the laser radar device in accordance with this Embodiment 1 calculates the searchable distance, and enables the vehicle to move along a route which enables the laser radar device to perform a search through an area in which there is a possibility that a target exists without omissions and which prevents the search range from overlapping. Therefore, the laser radar device can prevent omissions in the target detection due to decrease in the searchable distance which is caused by marine snow and increase in the search time due to an overlap of the search range from occurring, and perform an efficient search.

Although the above explanation is made by assuming that the vehicle moving route calculation device 3 calculates the moving route of the vehicle, a person can be allowed to manually set the moving route of the vehicle which prevents omissions in the target detection from occurring and which prevents the search range from overlapping, as appropriate, by referring to the calculated searchable distance, and cause the laser radar device to control the operation of the vehicle.

Instead of the laser device 41 of the target search device 4 and the laser device 11 of the marine snow measurement device 1, light sources, such as LEDs or lamps, which are not laser light sources can be used.

Further, the wavelength of the light emitted by the laser device 41 and that of the light emitted by the laser device 11 can be preset to ones having high transmissivity in the sea. Further, when the transmission loss in marine snow has a spectral characteristic, the wavelengths can be set to ones which reduce the transmission loss in the marine snow to a low value. As a result, the searchable distance can be extended and the search time can be shortened.

When calculating the attenuation coefficient α from the scattered light intensity signal, the attenuation coefficient can be determined by fitting an exponential function to the scattered light intensity signal. The above-mentioned fitting will be explained by using FIG. 5. The scattered light intensity signal increases temporarily when a time elapses since the time origin, and then decreases at some midpoint. By fitting an exponential function to the signal after the time when the above-mentioned decrease starts, the attenuation coefficient α is determined. The function used for the fitting is shown in the following equation (3).

$$A\exp(-\alpha ct) \qquad (3)$$

where A is an arbitrary constant.

The marine snow measurement device 1 can be made to operate only once before the vehicle starts moving, or can be made to continue operating while the vehicle moves.

In the case in which the marine snow measurement device is made to operate only once, because the searchable distance also varies when the amount of marine snow varies while the vehicle moves along the moving route, an omission in the target detection due to decrease in the searchable distance and increase in the search time due to an overlap of the search range may occur.

In contrast, in the case in which the marine snow measurement device is made to continue operating while the vehicle moves, even if the amount of marine snow varies during the movement, by calculating the searchable distance and the moving route again to correct the moving route on the way, omissions in the target detection due to decrease in the searchable distance and increase in the search time due to an overlap of the search range can be prevented from occurring.

Further, in the case in which the marine snow measurement device 1 is made to continue operating while the vehicle moves, the marine snow measurement device 1 and the target search device 4 can be made to start operating simultaneously, or can be made to start operating at times which are shifted from each other.

When the marine snow measurement device and the target search device are made to start operating simultaneously, there is a possibility that scattered light originating from the second laser light of the target search device 4 and scattered by marine snow is inputted to the marine snow measurement device 1, and hence the intensity of the scattered light scattered by the marine snow cannot be measured correctly due to a cross talk. Similarly, there is a possibility that reflected light originating from the first laser light of the marine snow measurement device 1 and reflected from a target is inputted to the target search device 4, and the three-dimensional shape of the target cannot be measured correctly due to a cross talk. In this case, by setting the first laser light and the second laser light in such away as to have different wavelengths, and disposing a first filter to allow the first laser light to pass therethrough, but not allow the second laser light to pass therethrough in the marine snow measurement device 1 and disposing a second filter not to allow the first laser light to pass therethrough, but allow the second laser light to pass therethrough in the target search device 4, the cross talks can be avoided.

In contrast, when the marine snow measurement device and the target search device are made to start operating at times which are shifted from each other, the first and second filters become unnecessary and the component count can be reduced. Because the marine snow measurement device and the target search device are made to start operating at times which are shifted from each other, it is necessary to control the timing of the pulse modulation on each laser light.

The gyroscope 51 can be a magnetic compass.

When a submarine topography and an artifact in the sea can be measured by using an active sonar or a laser radar, the position and the azimuth of the vehicle can be calculated by using these pieces of information. In this case, because the inertial navigation device 5 becomes unnecessary, the component count can be reduced.

The laser radar device in accordance with the present invention can be used together with an active sonar that employs an acoustic wave.

Because an active sonar that employs an acoustic wave provides a small amount of attenuation at the time of the acoustic wave propagating in the sea as compared with that of laser light, an echo from a target at a long distance can be detected. Therefore, by using the laser radar device together with an active sonar that employs an acoustic wave, the laser radar device can be used properly according to the purpose.

For example, a target at a long distance is detected by using the active sonar and the vehicle is made to get close to the target. After that, a measurement is performed with a high degree of accuracy by using the laser radar device, thereby being able to determine and detect the shape and the size of the object.

Further, because in the vicinity of a complicated topographical feature, such as a sea bottom, a high spatial resolution is required, a measurement can be performed with a high degree of accuracy by using the laser radar device, while in wide space other than such a complicated topographical feature, a measurement can be performed over a wide area by using the active sonar.

The target search device 4 can detect a target by using scattered light intensity. In this case, the distance detection device 49 is replaced by a distance intensity detection device that can also detect the scattered light intensity in addition to the distance.

In the case of detecting a target by using the scattered light intensity, as mentioned above, patterns of the intensity of scattered light scattered from a target, each of which is expected in advance for the signal processing device 50, are provided, and, by performing matching with the pattern of the measured scattered light intensity, a target is detected. As a result, when a target has a hull identification indication, the distance intensity detection device can determine the hull identification indication to detect the target.

A high reflectivity object, such as a prism, can be disposed in advance in a target, and the target search device 4 can detect the target with reference to this high reflectivity object. As a result, because the target search device can measure a target at a longer distance, the searchable distance can be extended.

The method of modulating the laser light for use in both the target search device 4 and the marine snow measurement device 1 can be CW modulation. In the case of CW modulation, a time is measured from the phase difference between the modulation signal and the received signal.

In the target search device 4, instead of scanning the second laser light by using the scanner 45, the second laser light can be made to diverge in two dimensions and radiated at one time. In this case, the light receiver 48 needs to be formed in a two-dimensional array.

When laser light communications are performed after a target is detected, the position of the communication device can be recognized by using the three dimensional information about the target which is acquired by the target search device 4.

The laser radar device in accordance with the present invention can be mounted in a moving object, such as a car, an airplane, a helicopter, or a warship, instead of the underwater vehicle, and can measure the attenuation of the light wave which is caused by fog, rain, or the like, instead of marine snow, to determine the searchable distance.

Further, when the laser radar device in accordance with the present invention is used somewhere other than in the sea, as mentioned above, when the laser radar device is located at a shallow depth of water where the laser radar device can receive GPS signals even if it is in the sea, and when GPS signals can be received on the sea by using a periscope or the like, direct reception of GPS signals, instead of the use of the inertial navigation device 5, can be implemented to determine the position and the azimuth. In this case, because the inertial navigation device 5 becomes unnecessary, the component count can be reduced.

The laser radar device in accordance with the present invention can detect, as an obstacle, a sea bottom or an object different from a target, and change the moving route in such a way that the vehicle will avoid a collision. As a result, when an obstacle exists in the moving route, a collision can be avoided.

Embodiment 2

Although the laser radar device in accordance with above-mentioned Embodiment 1 is configured in such a way as to calculate the measurable distance from the amount of attenuation of a light wave, a laser radar device that keeps the measurable distance constant will be shown in Embodiment 2.

Figure 8:
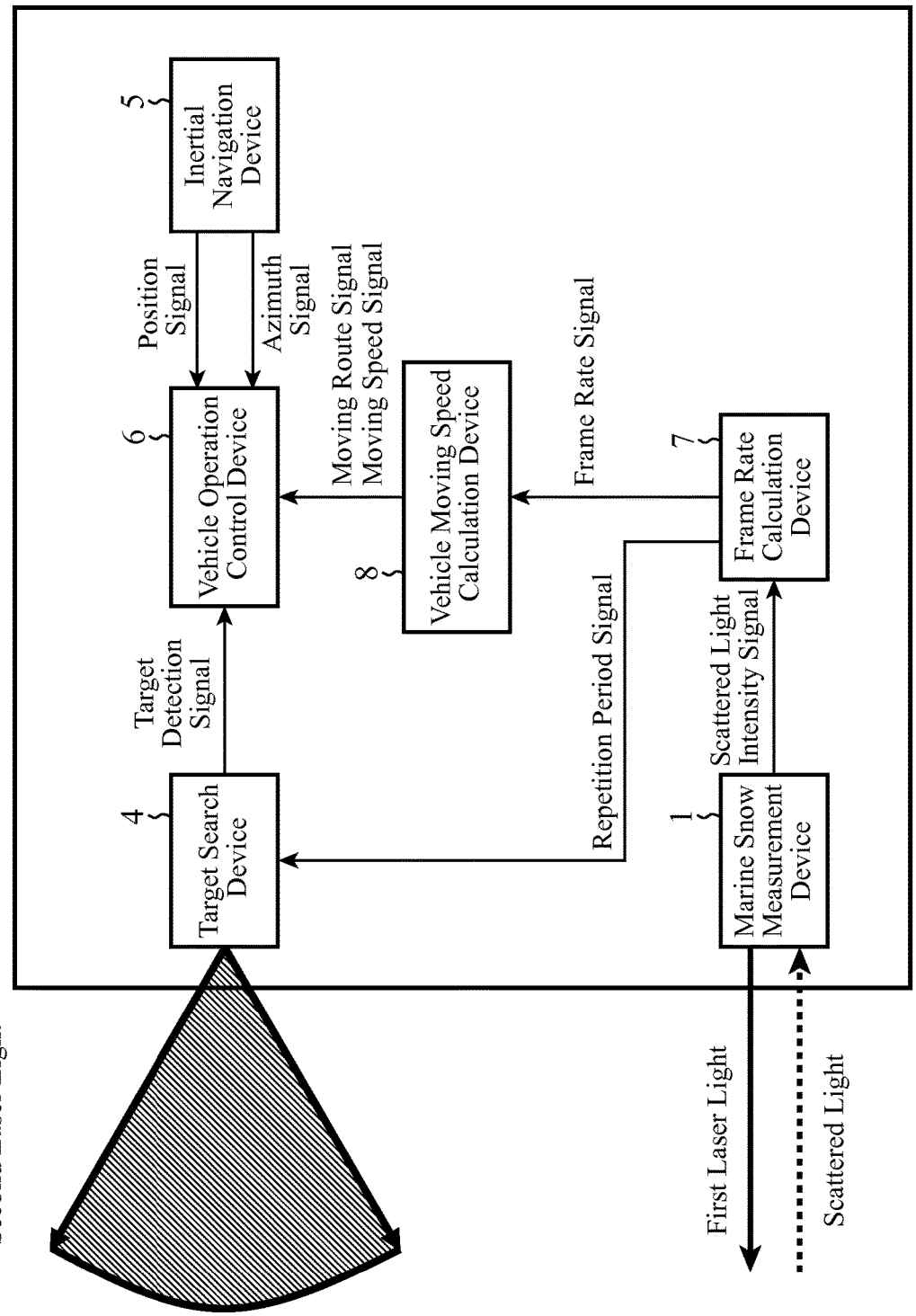
FIG. 8 is a diagram showing the configuration of a laser radar device in accordance with Embodiment 2 of the present invention.

The laser radar device in accordance with Embodiment 2 of the present invention will be explained by using FIG. 8. FIG. 8 is a structural diagram of the laser radar device in accordance with Embodiment 2 of the present invention. The laser radar device in accordance with Embodiment 2 of the present invention is provided with a marine snow measurement device 1, a target search device 4, an inertial navigation device 5, a vehicle operation control device 6, a frame rate calculation device 7, and a vehicle moving speed calculation device 8.

The same components as those shown in Embodiment 1 are denoted by the same reference numerals, and the explanation of the components will be omitted properly.

The configuration and functions of the marine snow measurement device 1 are the same as those shown in Embodiment 1.

Figure 9:
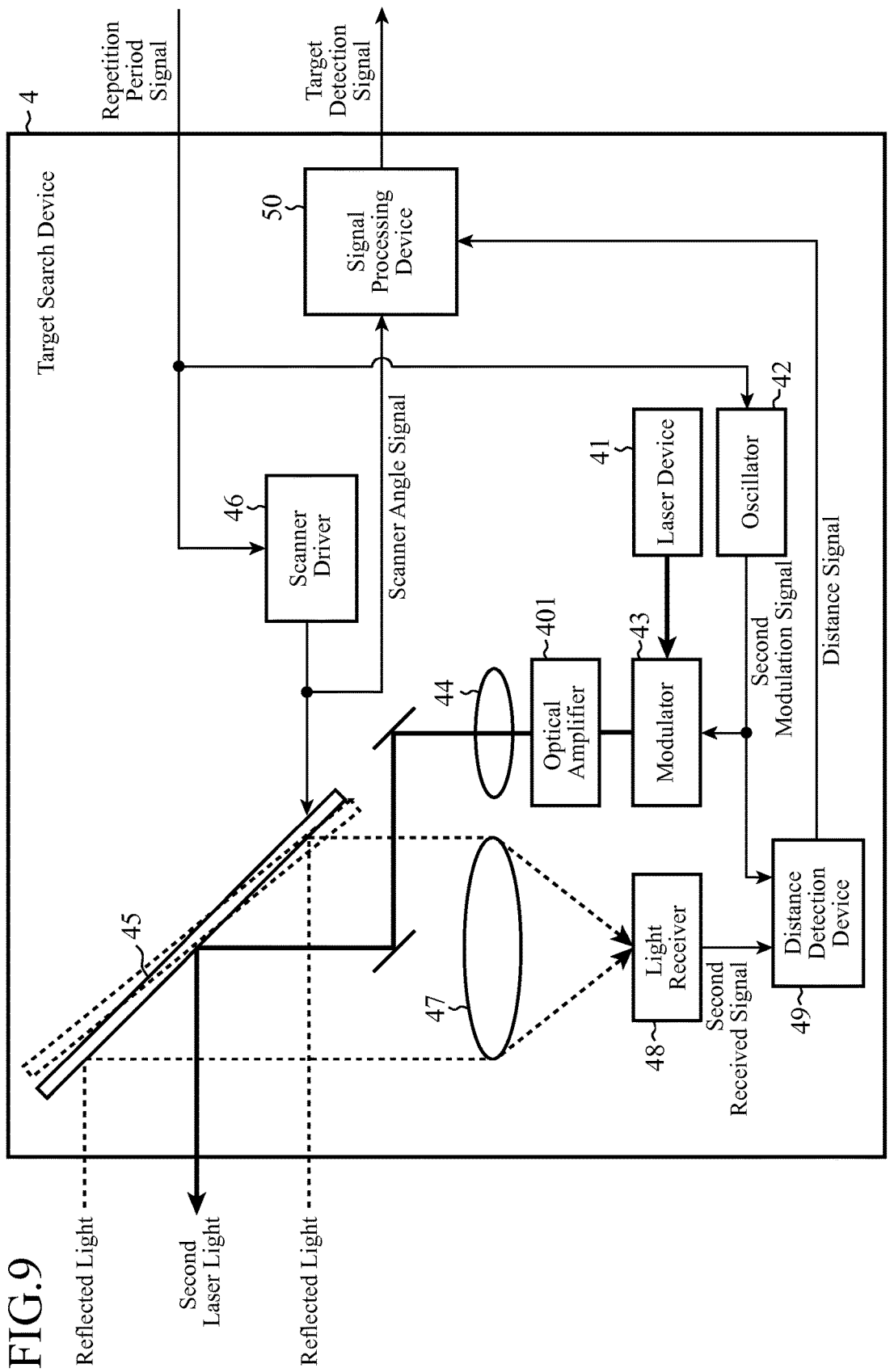
FIG. 9 is a diagram showing the configuration of a target search device of the laser radar device in accordance with Embodiment 2 of the present invention.

The configuration of the target search device 4 is shown in FIG. 9. The target search device 4 is configured to include an optical amplifier 401 in addition to the configuration shown in Embodiment 1. More specifically, the target search device is provided with a laser device 41, an oscillator 42, a modulator 43, the optical amplifier 401, a transmission lens 44, a scanner 45, a scanner driver 46, a reception lens 47, a light receiver 48, a distance detection device 49, and a signal processing device 50.

The optical amplifier 401 has a function of amplifying the power of second laser light on which pulse modulation is performed in proportion to the repetition period of the pulse modulation, and outputting the second laser light. The scanner driver 46 has a function of outputting a scanner angle signal showing an angle of the scanner 45 according to a repetition period signal. The oscillator 42 has a function of outputting a second modulation signal at a repetition period according to the repetition period signal.

The optical amplifier 401 constructs a light amplifier.

The configuration and functions of the inertial navigation device 5 are the same as those shown in Embodiment 1.

The vehicle operation control device 6 has a function of setting the moving speed of a vehicle according to a moving speed signal, and controlling the vehicle on the basis of a current position shown by a position signal and a current azimuth shown by an azimuth signal in such a way that the vehicle moves according to a moving route shown by a moving route signal. The vehicle operation control device 6 also has a function of stopping the movement of the vehicle when a target detection signal is inputted thereto.

The frame rate calculation device 7 has a function of, by using two threshold voltages $V_1$ and $V_2$ which are set in advance by a user or the like, measuring the times $t_1$ and $t_2$ when a scattered light intensity signal has values less than the threshold voltages $V_1$ and $V_2$, respectively, to calculate an attenuation coefficient showing the amount of attenuation of the laser light. The frame rate calculation device 7 also has a function of calculating a frame rate from the attenuation coefficient and also calculating the repetition period of the modulation which is performed on the second laser light in the target search device 4, and outputting the frame rate and the repetition period as a frame rate signal and the repetition period signal, respectively.

The frame rate calculation device 7 constructs a repetition period calculator.

The vehicle moving speed calculation device 8 has a function of calculating the moving speed by using the frame rate signal, and outputting the moving speed as the moving speed signal. The vehicle moving speed calculation device also has a function of, on the basis of a searchable distance which is set in advance by the user or the like, calculating the moving route which prevents a search range from overlapping and which enables the laser radar device to perform a search through a target search area without omissions, and outputting the moving route to the vehicle operation control device 6 as the moving route signal, like the vehicle moving route calculation device 3 in accordance with Embodiment 1.

The vehicle moving speed calculation device 8 constructs a moving speed calculator.

Next, the operation of the laser radar device in accordance with Embodiment 2 of the present invention configured as above will be explained. The explanation of the same portion as that shown in Embodiment 1 will be omitted properly.

The frame rate calculation device 7 calculates an attenuation coefficient α due to marine snow from the scattered light intensity signal outputted by the marine snow measurement device 1 by using the same method as that used by the searchable distance calculation device 2 in accordance with Embodiment 1.

The frame rate calculation device 7 also calculates a frame rate F at which the target search device 4 measures three dimensional data about an area surrounding the vehicle, by using the calculated attenuation coefficient α, and outputs the frame rate to the vehicle moving speed calculation device 8 as the frame rate signal. The frame rate calculation device further calculates the repetition period T of the pulse modulation, and outputs the repetition period to the oscillator 42 and the scanner driver 46 as the repetition period signal. A method of calculating the frame rate F and a method of calculating the repetition period T will be shown hereafter.

The frame rate calculation device calculates laser light power $P_L$ satisfying the searchable distance L which is set in advance by the user or the like, by using the attenuation coefficient α. A computation expression of the laser light power $P_L$ is shown in the following equation (4).

$$P_L = \frac{P_R}{\eta R \frac{1}{4L^2} \exp(-2\alpha L)} \quad (4)$$

In this equation, $P_R$ denotes the received light power which is a measurement limit, η denotes system efficiency, R denotes the reflectivity of a target, and L denotes the searchable distance. The above-mentioned parameters $P_R$, L, η, and R are set in advance by the user or the like.

The above-mentioned laser light power $P_L$ is determined by the output of the optical amplifier 401. Because the optical amplifier 401 outputs the power proportional to the repetition period T of the pulse modulation in the modulator 43, the frame rate calculation device calculates the repetition period T by using the following equation (5).

$$T = \frac{P_L}{a} \quad (5)$$

In this equation, a is the proportional coefficient between the repetition period T and the laser light power $P_L$ of the optical amplifier 401. This parameter a is set in advance by the user or the like.

The frame rate calculation device also calculates the frame rate F by using the repetition period T and the number N of points of measurement in each frame and according to the following equation (6).

$$F = \frac{1}{NT} \quad (6)$$

In this equation, the number N of points of measurement is set in advance by the user or the like.

The frame rate calculation device outputs the frame rate F which the frame rate calculation device calculates in the above-mentioned way to the vehicle moving speed calculation device 8 as the frame rate signal, and also outputs the repetition period T which the frame rate calculation device calculates in the above-mentioned way to the oscillator 42 and the scanner driver 46 as the repetition period signal.

The vehicle moving speed calculation device 8 calculates the vehicle moving speed v from both the frame rate F inputted as the frame rate signal and the set searchable distance L, and outputs the vehicle moving speed to the vehicle operation control device 6 as the moving speed signal. A computation expression (7) of the vehicle moving speed v will be shown below.

$$v = LF \quad (7)$$

The vehicle moving speed calculation device also calculates the moving route which prevents the search range from overlapping and which enables the laser radar device to perform a search through the target search area without omissions, on the basis of the searchable distance which is set in advance by the user or the like, and outputs the moving route to the vehicle operation control device 6 as the moving route signal, like the vehicle moving route calculation device 3 in accordance with Embodiment 1.

The vehicle operation control device 6 sets the moving speed of the vehicle according to the moving speed signal, and controls the vehicle on the basis of the current position and the current azimuth, respectively, shown by the position signal and the azimuth signal which are outputted by the inertial navigation device 5, in such a way that the vehicle moves according to the moving route shown by the moving route signal. The vehicle operation control device 6 also stops the movement of the vehicle when a target detection signal is inputted thereto.

The laser radar device in accordance with the present invention searches for a target by using the target search device 4 while controlling the movement of the vehicle in the above-mentioned way.

The oscillator 42 of the target search device 4 outputs the second modulation signal to the modulator 43 and the distance detection device 49 at the repetition period T according to the repetition period signal. The optical amplifier 401 amplifies the power of the second laser light on which the pulse modulation is performed in proportion to the repetition period T of the pulse modulation, and outputs the second laser light to the transmission lens 44. The scanner driver 46 outputs the scanner angle signal showing the angle of the scanner 45 to the scanner 45 and the signal processing device 50 according to the repetition period signal. Each of the other components of the target search device 4 performs the same operation as that shown in Embodiment 1, and, when detecting a target, the target search device outputs a target detection signal to the vehicle operation control device 6.

As mentioned above, the laser radar device in accordance with this Embodiment 2 changes the repetition period of the pulse modulation of the laser light to change the laser light power of the optical amplifier 401 in such a way as to keep the searchable distance constant, thereby making the searchable distance be constant, when the amount of attenuation of the light wave due to marine snow varies. Therefore, omissions in the target detection due to decrease in the searchable distance which is caused by marine snow and increase in the search time due to an overlap of the search range are prevented, thereby being able to perform an efficient search.

Further, because the searchable distance is kept constant, it becomes unnecessary to change the moving route of the vehicle, as compared with Embodiment 1, and an adjustment of the speed of the vehicle has only to be performed. Therefore, complicated movements, such as a change of the direction of the vehicle, become unnecessary, and the vehicle operation control can be simplified.

Although the vehicle moving speed calculation device 8 calculates the moving route and the moving speed of the vehicle in the above-mentioned embodiment, a device that calculates the moving route on the basis of the searchable distance can be disposed separately and configured in such a way as to output the moving route signal. As an alternative, a person can be allowed to set the moving route as appropriate by referring to the set searchable distance, set the moving speed as appropriate by referring to both the searchable distance and the frame rate signal, and cause the laser radar device to control the operation of the vehicle in such a way that omissions in the target detection are prevented from occurring and the search range does not overlap.

Embodiment 3

Although the marine snow measurement device 1 and the target search device 4 are disposed separately in above-mentioned Embodiments 1 and 2, a laser radar device in which a marine snow measurement device 1 and a target search device 4 are configured integrally with each other will be shown in Embodiment 3.

Figure 10:
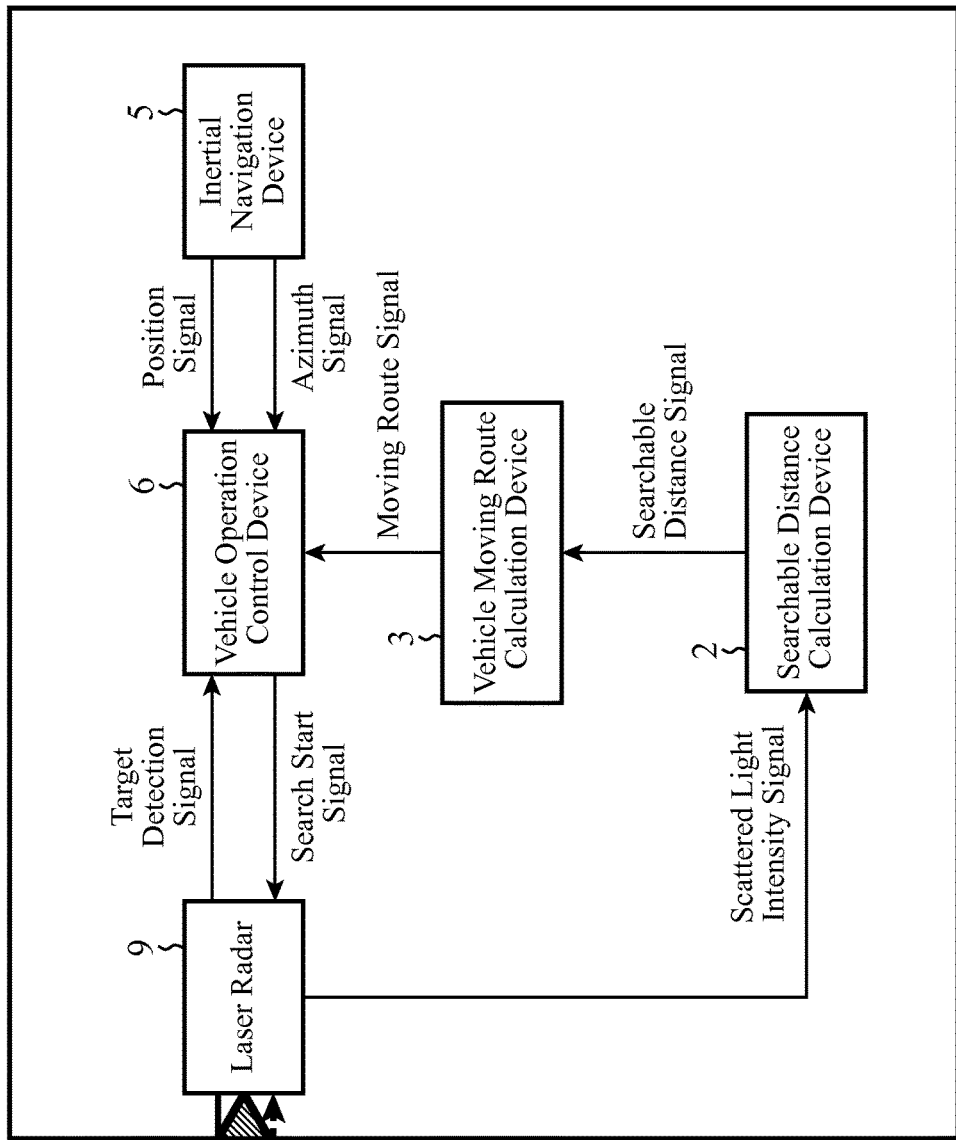
FIG. 10 is a diagram showing the configuration of a laser radar device in accordance with Embodiment 3 of the present invention.

The laser radar device in accordance with Embodiment 3 of the present invention will be explained by using FIG. 10. FIG. 10 is a structural diagram of the laser radar device in accordance with Embodiment 3 of the present invention. The laser radar device in accordance with Embodiment 3 of the present invention is provided with a searchable distance calculation device 2, a vehicle moving route calculation device 3, an inertial navigation device 5, a vehicle operation control device 6, and a laser radar 9.

The same components as those shown in Embodiment 1 are denoted by the same reference numerals, and the explanation of the components will be omitted properly.

Figure 11:
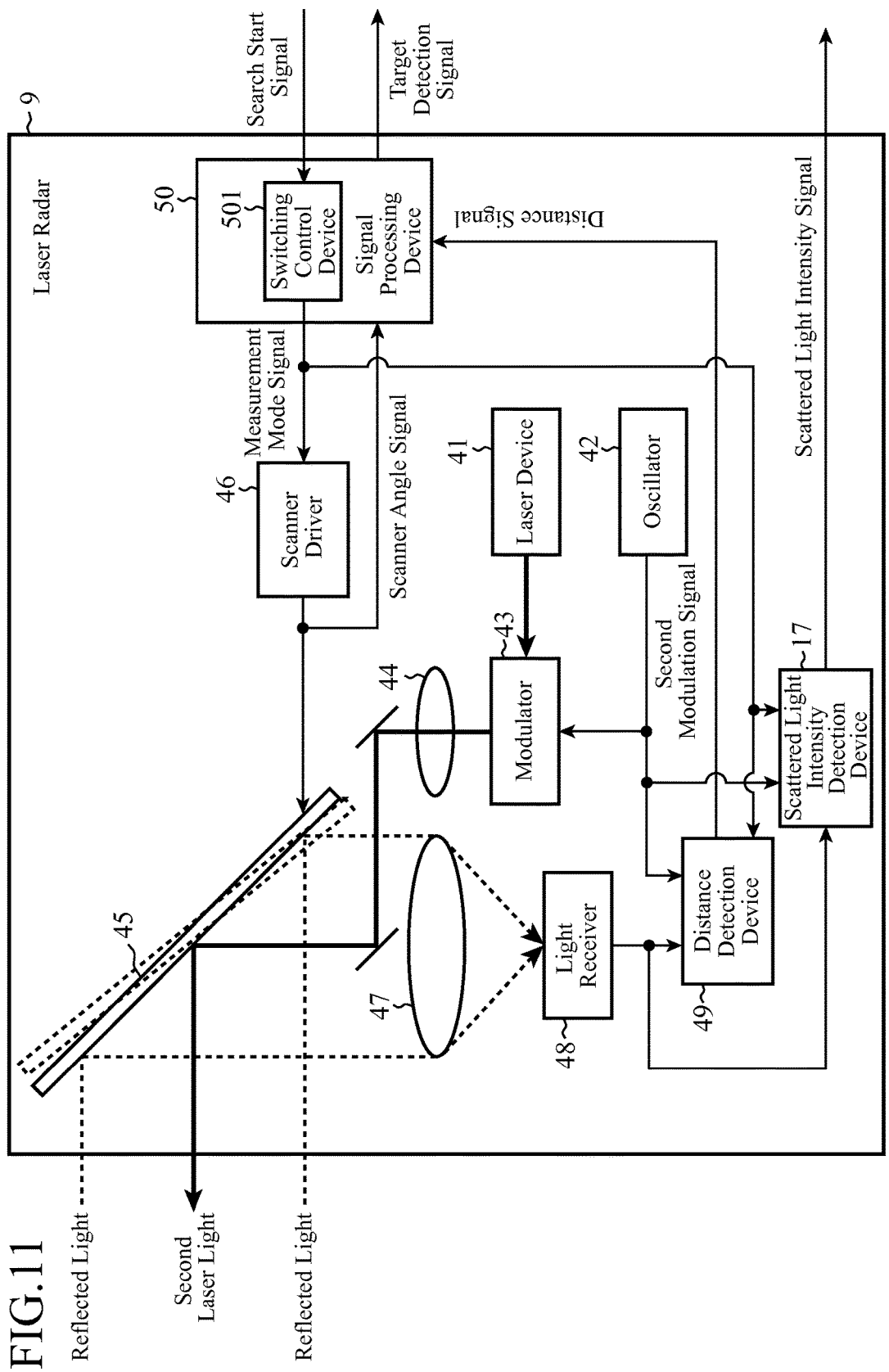
FIG. 11 is a diagram showing the configuration of a laser radar of the laser radar device in accordance with Embodiment 3 of the present invention.

The configuration of the laser radar 9 is shown in FIG. 11. The laser radar 9 is provided with a laser device 41, an oscillator 42, a modulator 43, a transmission lens 44, a scanner 45, a scanner driver 46, a reception lens 47, a light receiver 48, a distance detection device 49, a scattered light intensity detection device 17, and a signal processing device 50.

The signal processing device 50 has a switching control device 501 having a function of outputting a measurement mode signal for setting a measurement mode, in addition to having the function shown in Embodiment 1. A search start signal is inputted to the switching control device 501.

The switching control device 501 constructs a switching controller.

The scanner driver 46 has a function of stopping its operation when a marine snow measurement mode (scattered light measurement mode) signal which is one of measurement mode signals is inputted thereto, in addition to the function shown in Embodiment 1. The scanner driver also has a function of starting its operation when a target search mode (distance measurement mode) signal which is one of the measurement mode signals is inputted thereto.

The laser device 41, the oscillator 42, the modulator 43, the transmission lens 44, the scanner 45, and the scanner driver 46 construct a shared light projector, and the reception lens 47 and the light receiver 48 construct a shared light receiver.

The distance detection device 49 has a function of detecting a distance by measuring a flight distance and a flight time of reflected light on the basis of a second received signal and a second modulation signal, and outputting the distance to the signal processing device 50 as a distance signal. The distance detection device also has a function of stopping its operation when the marine snow measurement mode signal is inputted thereto. The distance detection device further has a function of starting its operation when the target search mode signal is inputted thereto.

The scattered light intensity detection device 17 has a function of measuring a temporal change in scattered light intensity on the basis of the second received signal and the second modulation signal with the time when the second modulation signal is inputted being defined as a time origin, and outputting the temporal change as a scattered light intensity signal. The scattered light intensity detection device has a function of starting its operation when the marine snow measuring mode signal is inputted thereto. The scattered light intensity detection device further has a function of stopping its operation when the target search mode signal is inputted thereto.

The vehicle operation control device 6 has a function of outputting a search start signal when a moving route signal is inputted thereto, in addition to the function shown in Embodiment 1.

Next, the operation of the laser radar device in accordance with Embodiment 3 of the present invention configured as above will be explained. The explanation of the same portion as that shown in Embodiment 1 will be omitted properly.

The signal processing device 50 of the laser radar 9 outputs the marine snow measurement mode signal which is one of the measurement mode signals to the distance detection device 49, the scanner driver 46, and the scattered light intensity detection device 17 at the time when the laser radar device starts operating.

When the marine snow measurement mode signal is inputted thereto, the distance detection device 49 and the scanner driver 46 stop their operations, and the scattered light intensity detection device 17 starts operating.

The scattered light intensity detection device 17 measures a temporal change in the scattered light intensity on the basis of the second received signal and the second modulation signal with the time when the second modulation signal is inputted being defined as a time origin, and outputs the temporal change to the searchable distance calculation device 2 as the scattered light intensity signal.

The second received signal is an electric signal into which scattered light focused by the reception lens 41 is converted by the light receiver 48, like that explained in Embodiment 1, and the scattered light is a part which is included in second laser light oscillated by the laser device 41, modulated by the modulator 43, and outputted via the transmission lens 44 and the scanner 45, and which is scattered by an object in the sea.

The searchable distance calculation device 2 calculates a searchable distance by using the scattered light intensity signal, and outputs this searchable distance to the vehicle moving route calculation device 3 as a searchable distance signal.

The vehicle moving route calculation device 3 calculates a moving route by using the searchable distance signal, and outputs this moving route to the vehicle operation control device 6 as a moving route signal.

The vehicle operation control device 6 causes the vehicle to start moving by using a position signal and a direction signal which are outputted by the inertial navigation device 5 and according to the moving route signal. Further, the vehicle operation control device outputs a search start signal to the signal processing device 50 when triggered by an input of the moving route signal.

When the search start signal is inputted thereto, the signal processing device 50 outputs the target search mode signal which is one of the measurement mode signals to the distance detection device 49, the scanner driver 46, and the scattered light intensity detection device 17.

When the target search mode signal is inputted thereto, the distance detection device 49 and the scanner driver 46 start operating and the scattered light intensity detection device 17 stops its operation.

The scanner driver 46 outputs a scanner angle signal specifying an angle of the scanner 45 to the scanner 45.

The scanner 45 scans a transmission direction and a receiving field of view of the second laser light which is oscillated by the laser device 41, modulated by the modulator 43, and passes through the transmission lens 44 according to the scanner angle signal.

The reflected light focused by the reception lens 41 is converted into a second received signal by the light receiver 48, and is outputted to the distance detection device 49.

The distance detection device 49 detects the distance by measuring the flight distance and the flight time of the reflected light on the basis of the second received signal and the second modulation signal, and outputs the distance to the signal processing device 50 as a distance signal.

When detecting a target, the signal processing device 50 outputs a target detection signal to the vehicle operation control device 6.

Although in the above-mentioned embodiment, the configuration in which the marine snow measurement device 1 and the target search device 4 shown in Embodiment 1 are configured integrally with each other as the laser radar 9 is shown, the marine snow measurement device 1 and the target search device 4 shown in Embodiment 2 can be configured integrally with each other as the laser radar 9.

As mentioned above, the laser radar device in accordance with this Embodiment 3 can calculate the searchable distance, and enables the vehicle to move along a route which enables the laser radar device to search through an area in which there is a possibility that a target exists in such away that omissions are prevented from occurring and the search range does not overlap. Therefore, omissions in the target detection due to decrease in the searchable distance which is caused by marine snow and increase in the search time due to an overlap of the search range are prevented, thereby being able to perform an efficient search.

Further, because the laser radar device in accordance with Embodiment 3 is the one in which in the laser radar device shown in any of Embodiments 1 and 2, the target search device 4 and the marine snow measurement device 1 are configured integrally with each other as the laser radar 9, and share the laser device, the oscillator, the modulator, the transmission lens, the reception lens, and the light receiver, the number of device components can be reduced, and the device can be produced at a low cost and downsized.

The marine snow measurement mode can be activated only once at the time when the laser radar device starts operating, or switching from the target search mode to the marine snow measurement mode can be performed while the vehicle moves.

In the case in which the marine snow measurement mode is activated only once, because the searchable distance also varies when the amount of marine snow varies while the vehicle moves according to the moving route, an omission in the target detection due to decrease in the searchable distance and increase in the search time due to an overlap of the search range may occur.

In contrast, when switching from the target search mode to the marine snow measurement mode while the vehicle moves, by calculating the searchable distance again and also calculating the moving route to correct the moving route on the way, omissions in the target detection due to decrease in the searchable distance and increase in the search time due to an overlap of the search range can be prevented from occurring.

Embodiment 4

Although the laser radar device in accordance with any of above-mentioned Embodiments 1 to 3 is configured in such a way as to search for a target by using the second laser light, a laser radar device that searches for a target by detecting laser light transmitted by the target will be shown in Embodiment 4.

Figure 12:
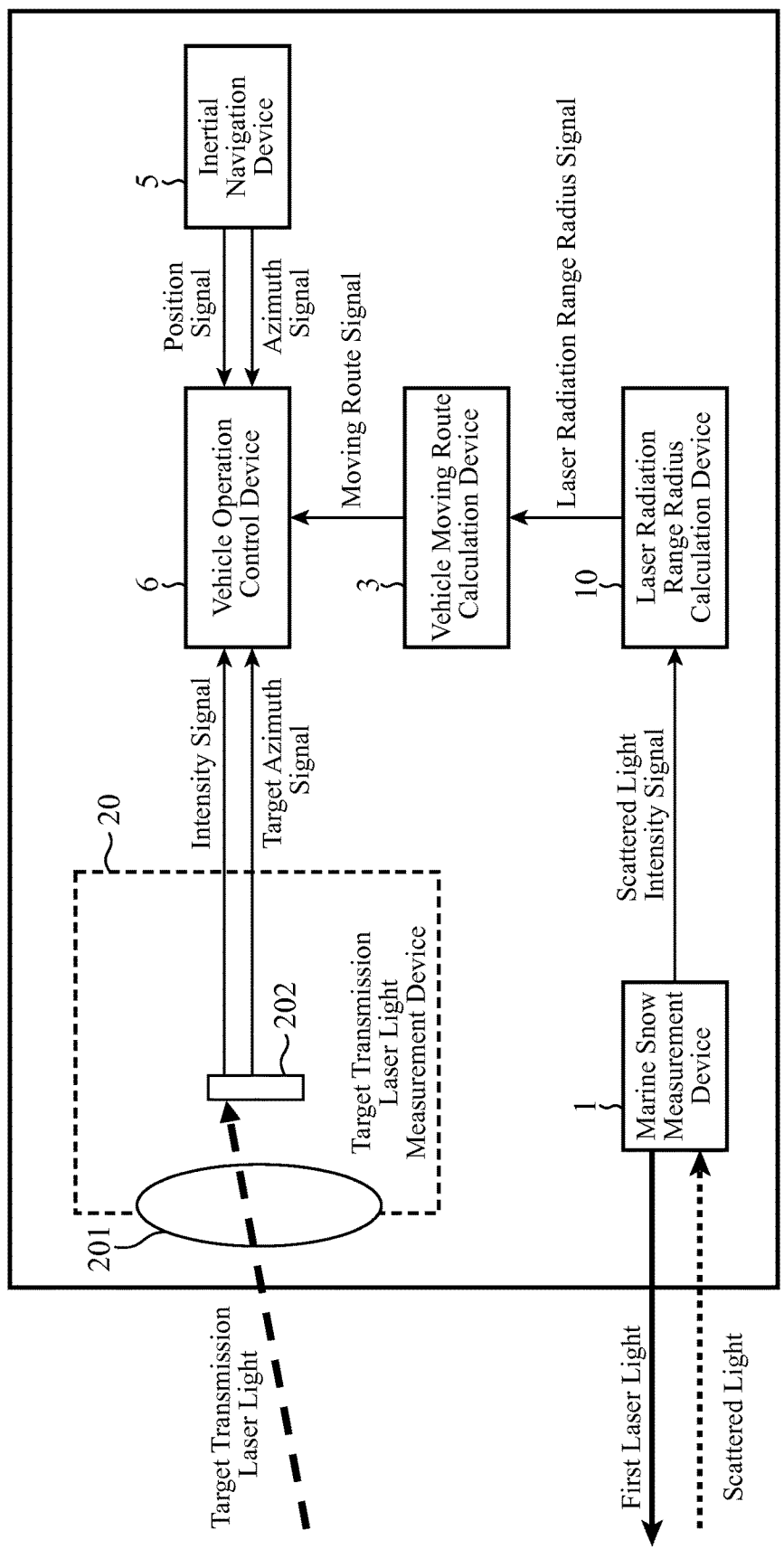
FIG. 12 is a diagram showing the configuration of a laser radar device in accordance with Embodiment 4 of the present invention.

The laser radar device in accordance with Embodiment 4 of the present invention will be explained by using FIG. 12. FIG. 12 is a structural diagram of the laser radar device in accordance with Embodiment 4 of the present invention. The laser radar device in accordance with Embodiment 4 of the present invention is provided with a marine snow measurement device 1, a vehicle moving route calculation device 3, an inertial navigation device 5, a vehicle operation control device 6, a laser radiation range radius calculation device 10, and a target transmission laser beam measurement device 20.

The same components as those shown in Embodiment 1 are denoted by the same reference numerals, and the explanation of the components will be omitted properly.

The configurations and functions of the marine snow measurement device 1 and the inertial navigation device 5 are the same as those shown in Embodiment 1.

The laser radiation range radius calculation device 10 has a function of calculating an attenuation coefficient α showing an amount of attenuation of laser light by using a scattered light intensity signal outputted by the marine snow measurement device 1 and according to the above-mentioned equation (1), like the searchable distance calculation device 2 in accordance with Embodiment 1.

The laser radiation range radius calculation device 10 also has a function of calculating a laser radiation range radius Lt by using the calculated attenuation coefficient α, and outputting the laser radiation range radius to the vehicle moving route calculation device 3 as a laser radiation range radius signal. The laser radiation range radius Lt indicates the radius of a range in which the target transmission laser beam measurement device 20 can detect laser light transmitted by a target with the target being placed at the center of the range. A computation expression of the laser radiation range radius is shown in the following equation (8).

$$L_t = -\frac{1}{2\alpha}\log\left(\frac{P_R}{P_t}\right) \qquad (8)$$

In the equation (8), $P_R$ denotes the received light power which is a measurement limit in the target transmission laser beam measurement device 20, and $P_t$ denotes the power of laser light radiated by a target. The parameters $P_R$ and $P_t$ are set in advance by a user or the like.

The laser radiation range radius calculation device 10 constructs a light wave radiation range calculator.

The vehicle moving route calculation device 3 has a function of, by using both the laser radiation range radius and a target search area which is set in advance by the user or the like and in which there is a possibility that a target exists, calculating a moving route which enables the laser radar device to search for a target in the target search area without omissions and an overlap, and outputting the moving route as a moving route signal.

A target (not shown) transmits laser light in all directions as target transmission laser light.

The target transmission laser beam measurement device 20 is provided with a reception lens 201 and an array type receiver 202. The reception lens 201 has a function of focusing the target transmission laser light which is the laser light transmitted by the target, and outputting the target transmission laser light to the array type receiver 202. The array type receiver 202 has a function of, when the power of the target transmission laser light focused by the reception lens 201 is equal to or less than its detection limit, converting the focused target transmission laser light into an electric signal, and outputting this electric signal as an intensity signal. The array type receiver 202 also has a function of calculating an incidence direction of the target transmission laser light from the focused position which is the position at which the target transmission laser light is focused by the reception lens 201 at that time, and outputting the incidence direction as a target azimuth signal.

The incidence direction θ of the target transmission laser light is calculated according to the following equation (9), where the focal distance of the reception lens 201 is expressed by f and the distance from the center of the array type receiver 202 to the focused position is expressed by h.

$$\theta = \frac{h}{f} \quad (9)$$

The target transmission laser beam measurement device 20 constructs a target light wave detector.

The vehicle operation control device 6 has a function of controlling the vehicle on the basis of a current position and a current azimuth which are respectively shown by a position signal and an azimuth signal which are outputted by the inertial navigation device 5 in such a way that the vehicle moves along the moving route shown by the moving route signal. The vehicle operation control device 6 also has a function of stopping the movement of the vehicle when an intensity signal and the target azimuth signal are inputted thereto.

Next, the operation of the laser radar device in accordance with Embodiment 4 of the present invention configured as above will be explained. The explanation of the same portion as that shown in Embodiment 1 will be omitted properly.

The laser radiation range radius calculation device 10 calculates an attenuation coefficient α due to marine snow from the scattered light intensity signal outputted by the marine snow measurement device 1 by using the same method as that used by the searchable distance calculation device 2 in accordance with Embodiment 1.

The laser radiation range radius calculation device 10 also calculates the laser radiation range radius Lt by using the calculated attenuation coefficient α, as shown in the above-mentioned equation (8), and outputs the laser radiation range radius to the vehicle moving route calculation device 3 as a laser radiation range radius signal.

The vehicle moving route calculation device 3 calculates the moving route of the vehicle which prevents the search range from overlapping and which enables the laser radar device to perform a search through the target search area without omissions from both the laser radiation range radius Lt inputted as the laser radiation range radius signal, and the target search area which is set in advance by the user or the like and in which there is a possibility that the target exists, and outputs the moving route to the vehicle operation control device 6 as the moving route signal.

Figure 13:
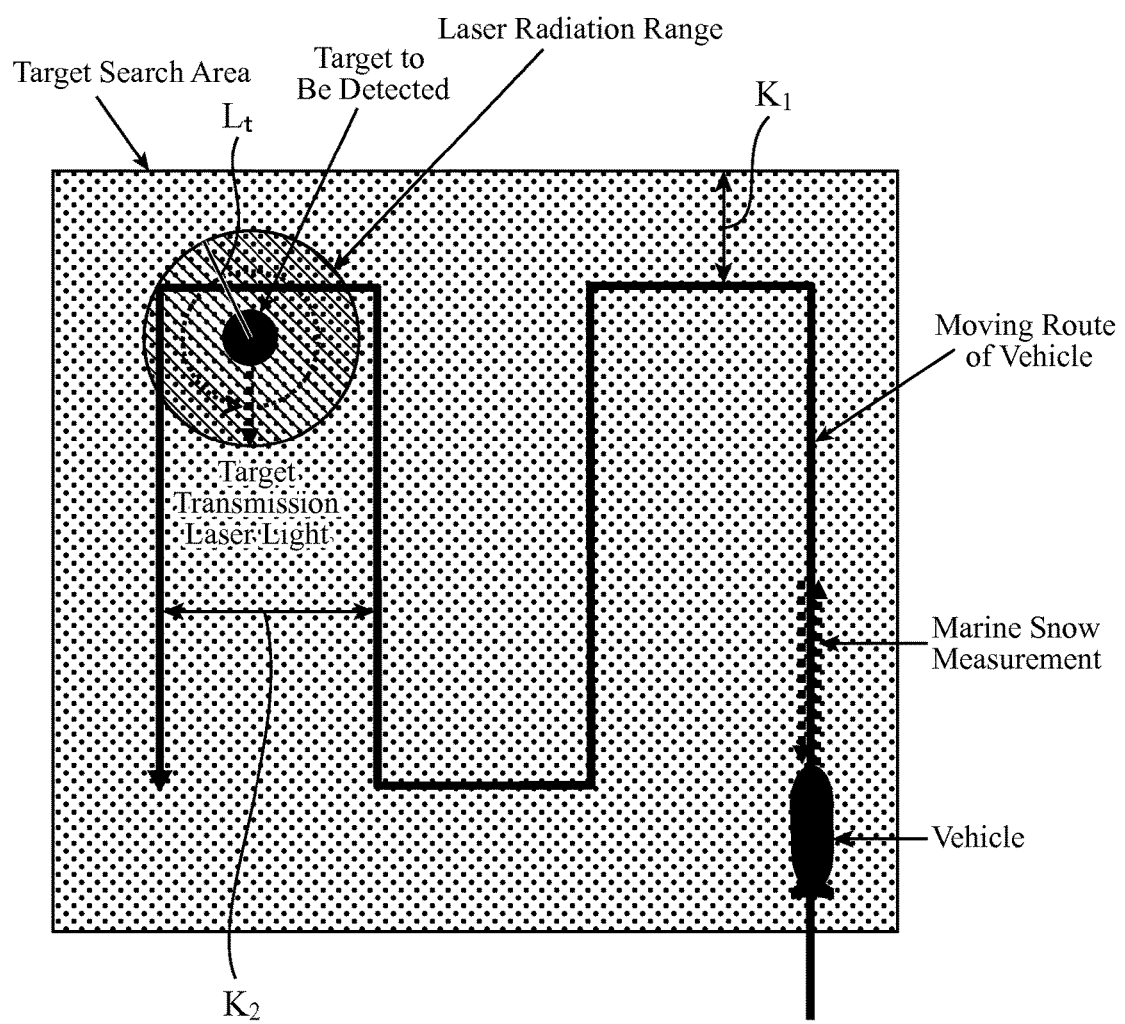
FIG. 13 is a diagram showing a moving route when there is little marine snow.

Because the laser radiation range radius Lt is long when, for example, there is little marine snow, the gap between the boundary of the target search area and the moving route of the vehicle (for example, $K_1$ in the figure), the gap between adjacent paths of the moving route ($K_2$ in the figure), and so on are wide in the moving route calculated, as shown in FIG. 13, and the length of the entire moving route is short. In contrast, because the laser radiation range radius Lt is short when, for example, there is much marine snow, as shown in FIG. 14, the gap between the boundary of the target search area and the moving route of the vehicle (for example, $K_1$ in the figure), the gap between adjacent paths of the moving route ($K_2$ in the figure), and so on are narrow in the moving route calculated, as shown in FIG. 14, and the length of the entire moving route is long.

Figure 14:
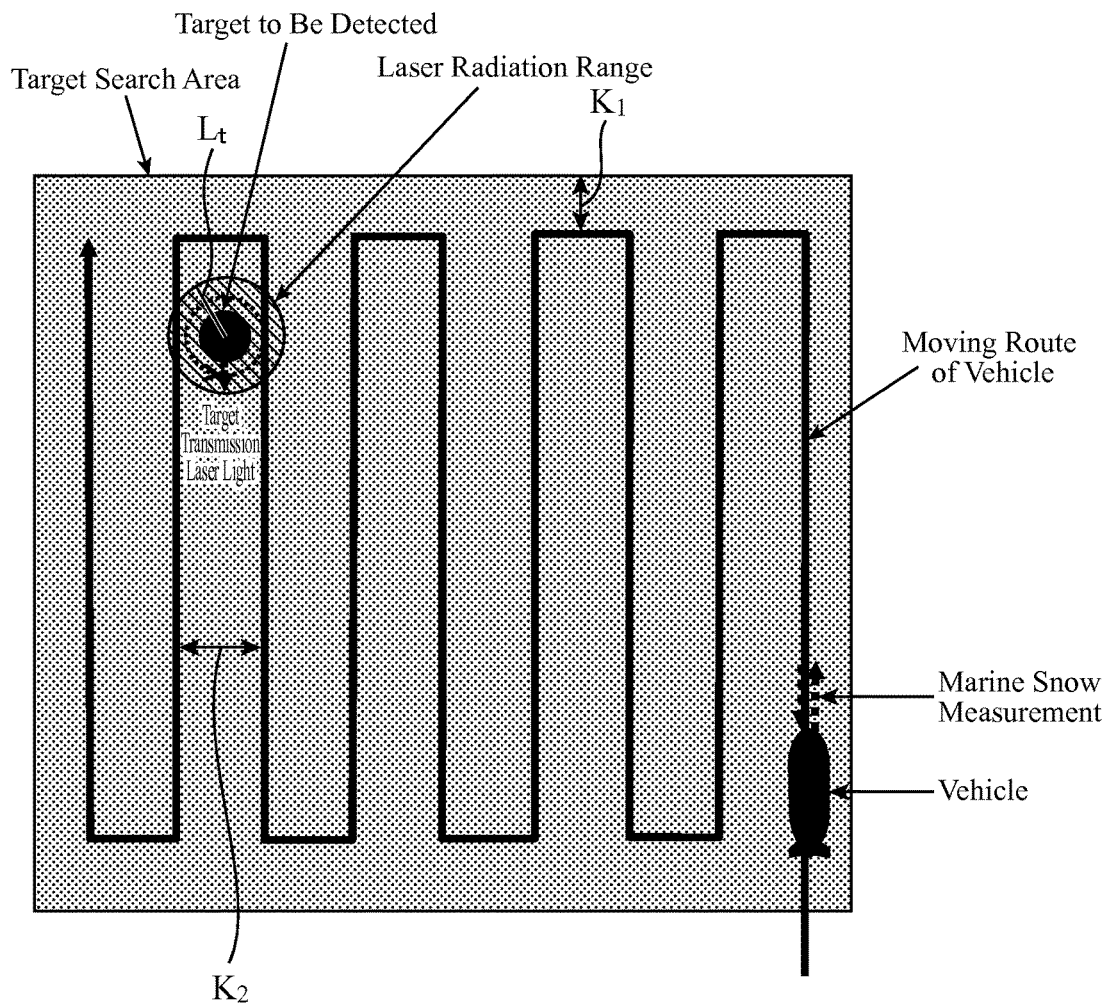
FIG. 14 is a diagram showing a moving route when there is much marine snow.

In any of the cases of FIGS. 13 and 14, the moving route calculated is the one which enables the laser radar device to perform a search through the target search area without omissions and which prevents any needless overlap from occurring in the search range.

The vehicle operation control device 6 controls the vehicle on the basis of the current position and the current azimuth which are respectively shown by the position signal and the azimuth signal which are outputted by the inertial navigation device 5 in such a way that the vehicle moves along the moving route shown by the moving route signal outputted by the vehicle moving route calculation device 3. The vehicle operation control device 6 also stops the movement of the vehicle when the intensity signal and the target azimuth signal are inputted thereto from the target transmission laser beam measurement device 20.

The laser radar device in accordance with the present invention searches for the target by detecting the target transmission laser light transmitted by the target by using the target transmission laser beam measurement device 20 while controlling the movement of the vehicle in the above-mentioned way.

The target to be searched transmits laser light in all directions as the target transmission laser light, and the reception lens 201 focuses this target transmission laser light transmitted from the target and outputs the target transmission laser light to the array type receiver 202.

When the power of the target transmission laser light focused by the reception lens 201 is equal to or greater than its detection limit, the array type receiver 202 converts this focused target transmission laser light into an electric signal, and outputs this electric signal to the vehicle operation control device 6 as the intensity signal. The array type receiver 202 also calculates the incidence direction θ of the target transmission laser light from the focused position which is the position at which the target transmission laser light is focused by the reception lens 201 at that time, as shown in the above-mentioned equation (9), and outputs the incidence direction to the vehicle operation control device 6 as the target azimuth signal.

As mentioned above, when the intensity signal and the target azimuth signal are outputted to the vehicle operation control device 6, the movement of the vehicle is stopped.

As mentioned above, the laser radar device in accordance with Embodiment 4 can calculate the laser radiation range radius, and enables the vehicle to move along a route which enables the laser radar device to search through an area in which there is a possibility that a target exists in such a way that omissions are prevented from occurring and the search range does not overlap. Therefore, omissions in the target detection due to decrease in the laser radiation range radius which is caused by marine snow and increase in the search time due to an overlap of the search range are prevented, thereby being able to perform an efficient search.

Further, because the laser radar device in accordance with Embodiment 4 does not have to include the target search device 4, the component count and the power consumption can be decreased by those corresponding to the scanner 45, laser device 41 and so on, as compared with Embodiments 1 and 2, the weight and the power consumption of the vehicle can be reduced.

Although the above explanation is made by assuming that the vehicle moving route calculation device 3 calculates the moving route of the vehicle, a person can be allowed to manually set the moving route of the vehicle which prevents omissions in the target detection from occurring and which prevents the search range from overlapping, as appropriate, by referring to the calculated laser radiation range radius, and cause the laser radar device to control the operation of the vehicle.

The laser light which the target transmits in all directions can be transmitted in all directions at one time, or can be transmitted with being scanned in all directions.

As the reception lens 201 of the target transmission laser beam measurement device 20, a wide angle lens, such as a fish-eye lens, can be used and configured in such a way as to be able to receive the target transmission laser light certainly.

Figure 15:
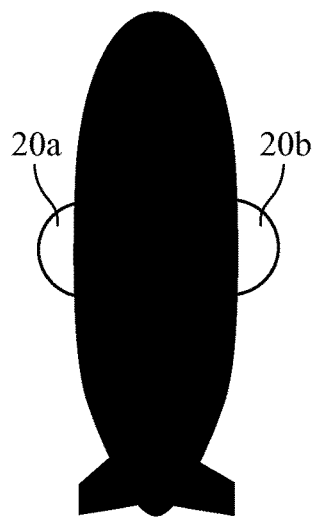
FIG. 15 is a plane view showing an installation position of a target transmission laser beam measurement device of the laser radar device in accordance with Embodiment 4 of the present invention.

The target transmission laser beam measurement device 20 can be configured by arranging target transmission laser beam measurement devices 20a and 20b each having a hemispherical field of view on both side surfaces of the vehicle, respectively. A plane view of the vehicle in this case is shown in FIG. 15. By configuring the target transmission laser beam measurement device in this way, the target transmission laser light transmitted in all directions can be received without reception failures.

The array type receiver 202 can be configured to employ a light receiver in a two dimensional array, thereby being able to ensure a two-dimensional field of view.

In a case in which a configuration is provided in which the vehicle and the target communicates with each other, the vehicle operation control device 6 can control the vehicle on the basis of the target azimuth signal outputted by the target transmission laser beam measurement device 20 to cause the vehicle to get close to the target. As a result, communications in a state in which the signal to noise ratio (S/N ratio) is high can be performed.

Further, the vehicle operation control device 6 can calculate the distance from the vehicle to the target on the basis of both the intensity signal outputted by the target transmission laser beam measurement device 20, and the attenuation coefficient α calculated by the laser radiation range radius calculation device 10. As a result, the vehicle operation control device 6 can control the movement of the vehicle in such a way that the vehicle gets close to within a fixed distance to the target. In addition, because by calculating the distance from the vehicle to the target, a collision with the target can be prevented when causing the vehicle to get close to the target, the vehicle can be made to get close to the target in safety.

The light transmitted by the target can be light other than laser light, such as light from an LED (Light Emitting Diode) or a lamp.

Further, the wavelength of the laser light transmitted by the target can be preset to a one having high transmissivity in the sea. Further, when the transmission loss in marine snow has a spectral characteristic, the wavelength is set to a one which reduces the transmission loss in the marine snow to a low value. As a result, the laser radiation range radius can be extended and the search time can be shortened.

The marine snow measurement device 1 can be made to operate only once before the vehicle starts moving, or can be made to continue operating while the vehicle moves.

In the case in which the marine snow measurement device is made to operate only once, because the laser radiation range radius also varies when the amount of marine snow varies while the vehicle moves along the moving route, an omission in the target detection due to decrease in the laser radiation range radius and increase in the search time due to an overlap of the search range may occur.

In contrast, in the case in which the marine snow measurement device is made to continue operating while the vehicle moves, even if the amount of marine snow varies during the movement, by calculating the laser radiation range radius and the moving route again to correct the moving route on the way, omissions in the target detection due to decrease in the laser radiation range radius and increase in the search time due to an overlap of the search range can be prevented from occurring.

The laser radar device in accordance with the present invention can be used together with an active sonar that employs an acoustic wave.

Because an active sonar that employs an acoustic wave provides a small amount of attenuation at the time of the acoustic wave propagating in the sea as compared with that of laser light, an echo from a target at a long distance can be detected. Therefore, by using the laser radar device together with an active sonar that employs an acoustic wave, the laser radar device can be used properly according to the purpose.

For example, a target at a long distance is detected by using the active sonar and the vehicle is made to get close to the target. After that, the position of the target can be grasped correctly by detecting laser light from the target by using the laser radar device.

The laser radar device in accordance with Embodiment 4 can be mounted in a moving object, such as a car, an airplane, a helicopter, or a warship, instead of the underwater vehicle, and can measure the attenuation of the light wave which is caused by fog, rain, or the like, instead of marine snow, to determine the laser radiation range radius.

While the invention has been described in its preferred embodiments, it is to be understood that an arbitrary combination of two or more of the above-mentioned embodiments can be made, various changes can be made in an arbitrary component in accordance with any one of the above-mentioned embodiments, and an arbitrary component in accordance with any one of the above-mentioned embodiments can be omitted within the scope of the invention.

INDUSTRIAL APPLICABILITY

As mentioned above, because the laser radar device in accordance with the present invention can prevent omissions in the detection of a target and increase in the search time due to an overlap of the search range from occurring and can perform an efficient search, the laser radar device is suitable for use as a device that detects an object by using a light wave.

EXPLANATIONS OF REFERENCE NUMERALS 1 marine snow measurement device, 11 laser device (light projector for scattered light measurement), 12 oscillator (light projector for scattered light measurement), 13 modulator (light projector for scattered light measurement), 14 transmission lens (light projector for scattered light measurement), 15 reception lens (light receiver for scattered light measurement), 16 light receiver (light receiver for scattered light measurement), 17 scattered light intensity detection device (scattered light measurement instrument), 2 searchable distance calculation device (measurable distance calculator), 3 vehicle moving route calculation device (moving route calculator), 4 target search device, 41 laser device (light projector for distance measurement, shared light projector), 42 oscillator (light projector for distance measurement, shared light projector), 43 modulator (light projector for distance measurement, shared light projector), 44 transmission lens (light projector for distance measurement, shared light projector), 45 scanner (light projector for distance measurement, shared light projector), 46 scanner driver (light projector for distance measurement, shared light projector), 47 reception lens (light receiver for distance measurement, shared light receiver), 48 light receiver (light receiver for distance measurement, shared light receiver), 49 distance detection device (distance measurement instrument), 50 signal processing device (target detector), 401 optical amplifier (light amplifier), 501 switching control device (switching controller), 5 inertial navigation device (position direction recognizer), 51 gyroscope, 52 accelerometer, 53 position azimuth calculation device, 6 vehicle operation control device (movement controller), 7 frame rate calculation device (repetition period calculator), 8 vehicle moving speed calculation device (moving speed calculator), 9 laser radar, 10 laser radiation range radius calculation device (light wave radiation range calculator), 20, 20*a*, and 20*b* target transmission laser beam measurement device (target light wave detector), 201 reception lens, and 202 array type receiver.

The invention claimed is:

1. A laser radar device comprising:
   a scattered light measurement instrument to measure a temporal change in scattered light intensity of scattered light acquired through scattering of a light wave while propagating;
   a distance measurement instrument to perform a distance measurement on surroundings by using reflected light of a light wave;
   a measurable distance calculator to calculate an amount of attenuation at a time of propagation of the light wave from the temporal change in the scattered light intensity which is measured by said scattered light measurement instrument, and calculate a measurable distance in said distance measurement instrument from said amount of attenuation;
   a target detector to calculate three dimensional data from distances of surrounding points which are measured by said distance measurement instrument, to detect a target from said three dimensional data;
   a moving route calculator to calculate a moving route of a moving object by using the measurable distance calculated by said measurable distance calculator;
   a position direction recognizer to measure an acceleration of said moving object to recognize a position and to measure an angular speed of said moving object to recognize a direction; and
   a movement controller to move said moving object according to the moving route calculated by said moving route calculator.

2. The laser radar device according to claim 1, wherein said laser radar device comprises:
   a light projector for scattered light measurement to project the light wave for said scattered light measurement instrument;
   a light receiver for scattered light measurement to receive the scattered light of the light wave projected by said light projector for scattered light measurement;
   a light projector for distance measurement to project the light wave for said distance measurement instrument; and
   a light receiver for distance measurement to receive the reflected light of the light wave projected by said light projector for distance measurement.

3. The laser radar device according to claim 1, wherein said laser radar device comprises:
   a shared light projector to project both the light wave for said scattered light measurement instrument, and the light wave for said distance measurement instrument;
   a shared light receiver for both said scattered light measurement instrument and said distance measurement instrument; and
   a switching controller to perform control of switching between a scattered light measurement mode in which to cause said scattered light measurement instrument to operate, and a distance measurement mode in which to cause said distance measurement instrument to operate.

4. The laser radar device according to claim 1, wherein the measurable distance calculator has a function of, by using two threshold voltages $V_1$ and $V_2$ that are set in advance, measuring the times $t_1$ and $t_2$ when a scattered light intensity signal has values less than the threshold voltages $V_1$ and $V_2$, respectively, to calculate an attenuation coefficient showing the amount of attenuation.

5. A laser radar device comprising:
   a scattered light measurement instrument to measure a temporal change in scattered light intensity of scattered light acquired through scattering of a light wave while propagating;
   a repetition period calculator to calculate an amount of attenuation at a time of propagation of the light wave from the temporal change in the scattered light intensity which is measured by said scattered light measurement instrument, and calculate a repetition period from said amount of attenuation;
   a light amplifier to amplify power of the light wave in proportion to the repetition period which is calculated by said repetition period calculator;
   a distance measurement instrument to perform a distance measurement on surroundings by using reflected light of a light wave;
   a target detector to calculate three dimensional data from distances of surrounding points which are measured by said distance measurement instrument, to detect a target from said three dimensional data;
   a position direction recognizer to measure an acceleration of a moving object to recognize a position and to measure an angular speed of said moving object to recognize a direction;
   a moving speed calculator to calculate a moving speed of the moving object by using the repetition period calculated by said repetition period calculator; and
   a movement controller to move said moving object according to the moving speed calculated by said moving speed calculator.

6. The laser radar device according to claim 5, wherein said laser radar device comprises:
   a light projector for scattered light measurement to project the light wave for said scattered light measurement instrument;
   a light receiver for scattered light measurement to receive the scattered light of the light wave projected by said light projector for scattered light measurement;
   a light projector for distance measurement to project the light wave for said distance measurement instrument; and
   a light receiver for distance measurement to receive the reflected light of the light wave projected by said light projector for distance measurement.

7. The laser radar device according to claim 5, wherein said laser radar device comprises:
   a shared light projector to project both the light wave for said scattered light measurement instrument, and the light wave for said distance measurement instrument;
   a shared light receiver for both said scattered light measurement instrument and said distance measurement instrument; and
   a switching controller to perform control of switching between a scattered light measurement mode in which to cause said scattered light measurement instrument to operate, and a distance measurement mode in which to cause said distance measurement instrument to operate.

8. The laser radar device according to claim 5, wherein the repetition period calculator has a function of, by using two threshold voltages $V_1$ and $V_2$ that are set in advance, measuring the times $t_1$ and $t_2$ when a scattered light intensity signal has values less than the threshold voltages $V_1$ and $V_2$, respectively, to calculate an attenuation coefficient showing the amount of attenuation.

9. A laser radar device comprising:
a scattered light measurement instrument to measure a temporal change in scattered light intensity of scattered light acquired through scattering of a light wave while propagating;
a light wave radiation range calculator to calculate an amount of attenuation at a time of propagation of the light wave from the temporal change in the scattered light intensity which is measured by said scattered light measurement instrument, and calculate a light wave radiation range of a light wave, the radiation range extending from a target, from said amount of attenuation;
a target light wave detector to detect a light wave from said object;
a moving route calculator to calculate a moving route of a moving object by using the light wave radiation range calculated by said light wave radiation range calculator;
a position direction recognizer to measure an acceleration of said moving object to recognize a position and to measure an angular speed of said moving object to recognize a direction; and
a movement controller to move said moving object according to the moving route calculated by said moving route calculator.

10. The laser radar device according to claim 9, wherein the light wave radiation range calculator has a function of, by using two threshold voltages $V_1$ and $V_2$ that are set in advance, measuring the times $t_1$ and $t_2$ when a scattered light intensity signal has values less than the threshold voltages $V_1$ and $V_2$, respectively, to calculate an attenuation coefficient showing the amount of attenuation.

\* \* \* \* \*